US010447454B2

United States Patent
Kim et al.

(10) Patent No.: US 10,447,454 B2
(45) Date of Patent: Oct. 15, 2019

(54) METHOD AND DEVICE FOR FEEDING BACK CHANNEL STATE INFORMATION IN WIRELESS ACCESS SYSTEM SUPPORTING MACHINE TYPE COMMUNICATION

(71) Applicant: LG ELECTRONICS INC., Seoul (KR)

(72) Inventors: Bonghoe Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/568,777

(22) PCT Filed: Apr. 28, 2016

(86) PCT No.: PCT/KR2016/004454
§ 371 (c)(1),
(2) Date: Oct. 23, 2017

(87) PCT Pub. No.: WO2016/175576
PCT Pub. Date: Nov. 3, 2016

(65) Prior Publication Data
US 2018/0091280 A1    Mar. 29, 2018

Related U.S. Application Data

(60) Provisional application No. 62/154,689, filed on Apr. 29, 2015.

(51) Int. Cl.
*H04L 5/00* (2006.01)
*H04L 1/00* (2006.01)
(Continued)

(52) U.S. Cl.
CPC ......... *H04L 5/0057* (2013.01); *H04B 7/0626* (2013.01); *H04L 1/00* (2013.01);
(Continued)

(58) Field of Classification Search
CPC ......... H04L 5/0057; H04L 23/00; H04L 1/00; H04L 5/00; H04B 7/0626; H04B 7/0417;
(Continued)

(56) References Cited

U.S. PATENT DOCUMENTS

| 2014/0185479 A1 | 7/2014 | Lee |
| 2016/0285535 A1* | 9/2016 | Kim ...................... H04L 5/0016 |
| 2016/0337023 A1* | 11/2016 | Yi .......................... H04L 5/0046 |

FOREIGN PATENT DOCUMENTS

| WO | 2015012653 | 1/2015 |
| WO | 2015030523 | 3/2015 |
| WO | WO-2015030523 A1 * | 3/2015 | ........... H04L 5/0016 |

OTHER PUBLICATIONS

Samsung, Link Adaptation for Rel-13 Low Cost UEs (R1-151590), Apr. 20-24, 2015 (From Applicant's IDS) (Year: 2015).*
(Continued)

*Primary Examiner* — Mang Hang Yeung
(74) *Attorney, Agent, or Firm* — Lee Hong Degerman Kang Waimey

(57) ABSTRACT

The present invention relates to a wireless access system supporting machine type communication (MTC) and, particularly, to: a method by which an MTC terminal receives a channel state information index and feeds back channel state information on the basis of the channel state information index; and devices for supporting the method. As one aspect of the present invention, the method by which an MTC terminal feeds back channel state information (CSI) in a wireless access system for supporting machine type communication (MTC) can comprise the steps of: receiving an upper layer signal including a CQI index selected from a mother channel quality information (CQI) table; receiving a physical downlink shared channel (PDSCH) repeatedly transmitted on the basis of a modulation scheme and coding rate indicated by the CQI index; measuring CSI for the
(Continued)

PDSCH; and feeding back the measured CSI, wherein the mother CQI table is set to include up to a signal to interference plus noise ratio (SINR) area for a maximum coverage enhancement (CE) level supported in a network, and the CQI index can be selected in consideration of a CE level supportable by the MTC terminal.

10 Claims, 16 Drawing Sheets

(51) Int. Cl.
*H04W 4/70* (2018.01)
*H04B 7/06* (2006.01)
*H04W 72/04* (2009.01)
*H04W 72/08* (2009.01)
*H04L 23/00* (2006.01)
*H04B 7/0417* (2017.01)
*H04W 72/14* (2009.01)

(52) U.S. Cl.
CPC ............ *H04L 5/0044* (2013.01); *H04L 23/00* (2013.01); *H04W 4/70* (2018.02); *H04W 72/0413* (2013.01); *H04W 72/082* (2013.01); *H04B 7/0417* (2013.01); *H04W 72/14* (2013.01)

(58) Field of Classification Search
CPC . H04W 4/70; H04W 72/082; H04W 72/0413; H04W 72/14
USPC ........................................................ 370/252
See application file for complete search history.

(56) References Cited

OTHER PUBLICATIONS

Ericsson, CSI range and format for MTC, Feb. 9-13, 2015 (From Applicant's IDS) (Year: 2015).*
PCT International Application No. PCT/KR2016/004454, Written Opinion of the International Searching Authority dated Jul. 29, 2016, 19 pages.
Samsung, "Link Adaptation for Rel-13 Low Cost UEs", 3GPP TSG RAN WG1 Meeting #80bis, R1-151590, Apr. 2015, 4 pages.
Ericsson, "CSI range and format for MTC", 3GPP TSG RAN WG1 Meeting #80, R1-150024, Feb. 2015, 6 pages.

* cited by examiner

FIG. 4
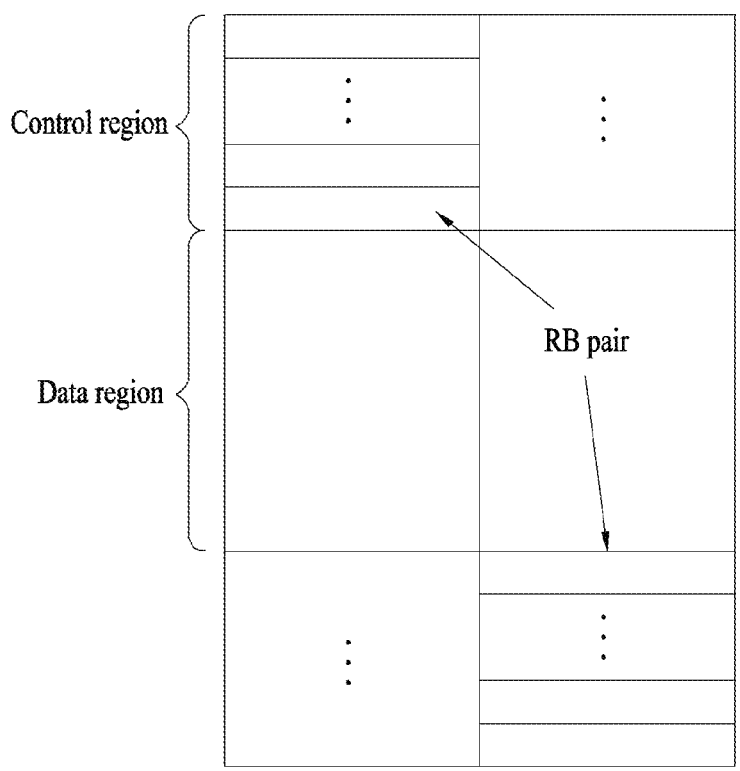
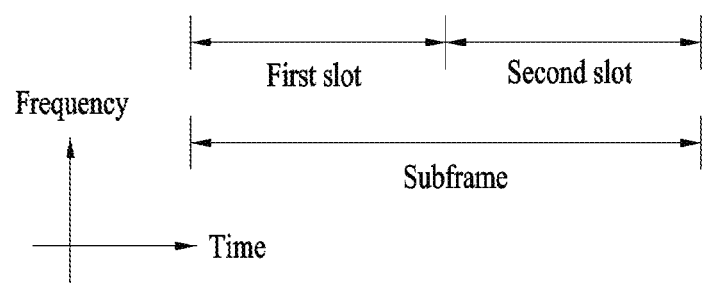

PUCCH format 1a and 1b structure (Nomal CP case)

PUCCH format 1a and 1b structure (Extended CP case)

PUCCH format 2, 2a and 2b structure (Nomal CP case)

PUCCH format 2, 2a and 2b structure (Extended CP case)

FIG. 10

Resource allocation: 18 ACK/NACK channels with nomal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | n' = 0 | | 12 | n' = 0 | | 12 |
| 2 | 1 | 1 | 6 | 13 | 1 | 6 | 13 |
| 3 | 2 | 2 | 7 | 14 | 2 | 7 | 14 |
| 4 | 3 | 3 | 8 | 15 | 3 | 8 | 15 |
| 5 | 4 | 4 | 9 | 16 | 4 | 9 | 16 |
| 6 | 5 | 5 | 10 | 17 | 5 | 10 | 17 |
| 7 | 6 | | 11 | | | 11 | |
| 8 | 7 | | | | | | |
| 9 | 8 | | | | | | |
| 10 | 9 | | | | | | |
| 11 | 10 | | | | | | |
| 0 | 11 | | | | | | |

$\Delta_{shift}^{PUCCH} \in \{\{1,2,3\}$ for nomal cyclic prefix, $\{1,2,3\}$ for extended cyclic prefix$\}$ $\delta_{offset}^{PUCCH} \in \{0,1,...,\Delta_{shift}^{PUCCH} - \}$ Cell specific cyclic shift offset $n_{OC}$ Ortogonal sequence index for ACK/NACK
$\bar{n}_{OC}$ Ortogonal sequence index for RS
$n_{CS}$ Cyclic shift value of a CAZAC sequence
n' ACK/NACK resource index used for the channelization in a RB Cell-specific Cyclic shift value of CAZAC sequence

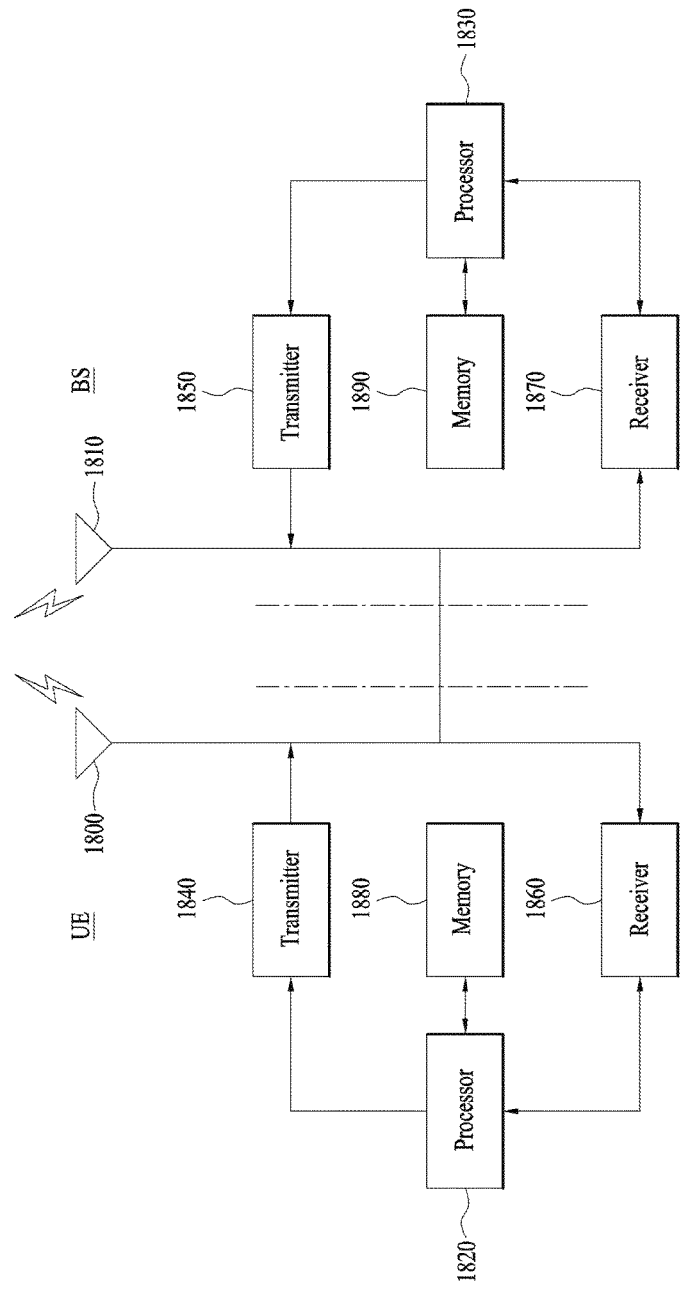

METHOD AND DEVICE FOR FEEDING BACK CHANNEL STATE INFORMATION IN WIRELESS ACCESS SYSTEM SUPPORTING MACHINE TYPE COMMUNICATION

CROSS-REFERENCE TO RELATED APPLICATIONS

This application is the National Stage filing under 35 U.S.C. 371 of International Application No. PCT/KR2016/004454, filed on Apr. 28, 2016, which claims the benefit of U.S. Provisional Application No. 62/154,689, filed on Apr. 29, 2015, the contents of which are all hereby incorporated by reference herein in their entirety.

TECHNICAL FIELD

The present disclosure relates to a wireless access system supporting Machine Type Communication (MTC), and more particularly, to a method for receiving a Channel State Information (CSI) index and feeding back CSI based on the CSI index by an MTC User Equipment (UE), and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An aspect of the present disclosure is to provide methods for transmitting and receiving data efficiently and reliably, for a Machine Type Communication (MTC) User Equipment (UE).

Another aspect of the present disclosure is to define a new Channel Quality Indicator (CQI) table to support MTC UEs.

Another aspect of the present disclosure is to define a mother CQI table and/or sub CQI tables to support MTC UEs.

Another aspect of the present disclosure is to provide methods for feeding back CSI by an MTC UE.

Another aspect of the present disclosure is to provide apparatuses supporting the above methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure relates to a wireless access system supporting Machine Type Communication (MTC), and more particularly, to a method for receiving a Channel State Information (CSI) index and feeding back CSI based on the CSI index, and apparatuses supporting the same.

In an aspect of the present disclosure, a method for feeding back CSI by an MTC UE in a wireless access system supporting MTC may include receiving a higher-layer signal including a Channel Quality Indicator (CQI) index selected from a mother CQI table, receiving a Physical Downlink Shared Channel (PDSCH) transmitted repeatedly based on a modulation scheme and a coding rate indicated by the CQI index, measuring CSI for the PDSCH, and feeding back the measured CSI. The mother CQI table may be configured to include up to a Signal to Interference plus Noise Ratio (SINR) area for a maximum Coverage Enhancement (CE) level supported by a network, and the CQI index may be selected in consideration of a CE level supported by the MTC UE.

In another aspect of the present disclosure, an MTC UE for feeding back CSI in a wireless access system supporting MTC may include a transmitter, a receiver, and a processor having information about one or more CQI tables for measuring CSI. The processor may be configured to receive a higher-layer signal including a CQI index selected from a mother CQI table by controlling the receiver, to receive a PDSCH transmitted repeatedly based on a modulation scheme and a coding rate indicated by the CQI index by controlling the receiver, to measure CSI for the PDSCH, and to feed back the measured CSI by controlling the transmitter. The mother CQI table may be configured to include up to an SINR area for a maximum CE level supported by a network. The CQI index may be selected in consideration of a CE level supported by the MTC UE.

The mother CQI table may be divided into two or more sub CQI tables, and the higher-layer signal may further include CQI table index information indicating one of the two or more sub CQI tables to be used.

CQI indexes included in the mother CQI table may indicate modulation schemes and coding rates configured to indicate the same SINR interval.

CQI index 1 to CQI index 15 of the mother CQI table may be determined by the maximum CE level.

The measured CSI may be transmitted repeatedly a predetermined number of times.

The above-described aspects of the present disclosure are merely some parts of the embodiments of the present disclosure and various embodiments into which the technical features of the present disclosure are incorporated may be derived and understood by persons skilled in the art from the following detailed description of the present disclosure.

Advantageous Effects

Embodiments of the present disclosure have the following effects.

Firstly, data may be transmitted and received efficiently and reliably, for a Machine Type Communication (MTC) User Equipment (UE).

Secondly, because an MTC UE is highly likely to be installed in a poor channel environment, the Signal to Interference plus Noise Ratio (SINR) of a Physical Downlink Shared Channel (PDSCH) or the like transmitted to the MTC UE may be low. Accordingly, if a Channel Quality Indicator (CQI) table is defined and a CQI index is transmitted in a conventional manner, the MTC UE may fail in receiving the PDSCH. In this context, as a new CQI table, a mother CQI table, and/or a sub CQI table is defined to support MTC UEs, the table(s) may help to increase even the coverage of an MTC UE installed in a poor environment.

Thirdly, an MTC UE may feed back CSI reliably.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 4 is a view illustrating an exemplary structure of an uplink subframe;

FIG. 10 is a view illustrating Acknowledgment/Negative Acknowledgment (ACK/NACK) channelization for PUCCH formats 1a an 1b;

FIG. 18 is a block diagram of apparatuses for implementing the methods described with reference to FIGS. 1 to 17.

BEST MODE FOR CARRYING OUT THE INVENTION

Figure 1:
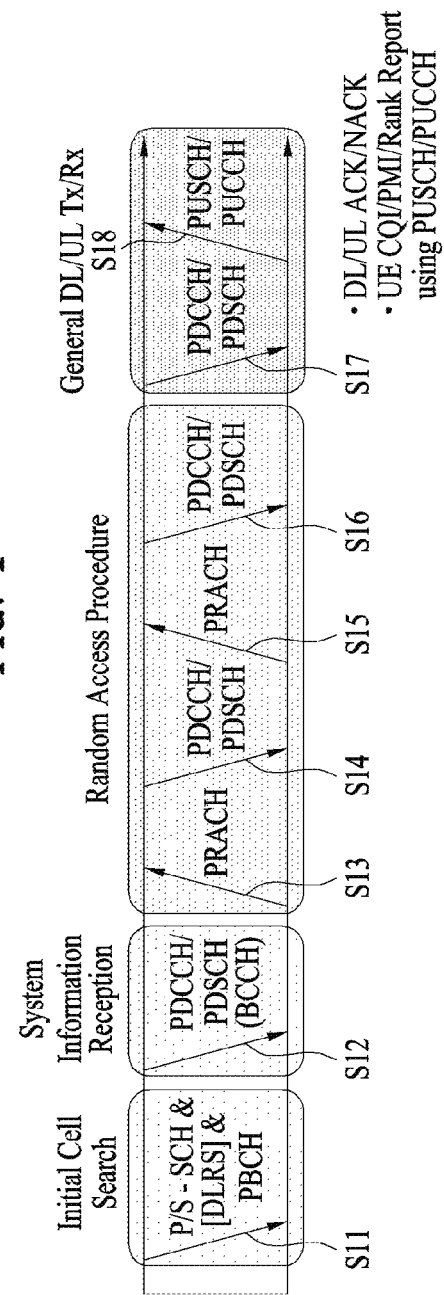
FIG. 1 is a view illustrating physical channels and a signal transmission method using the physical channels.

Embodiments of the present disclosure as described below in detail relate to a wireless access system supporting an unlicensed band, and propose methods for controlling uplink power and apparatuses supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (WiFi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1.3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
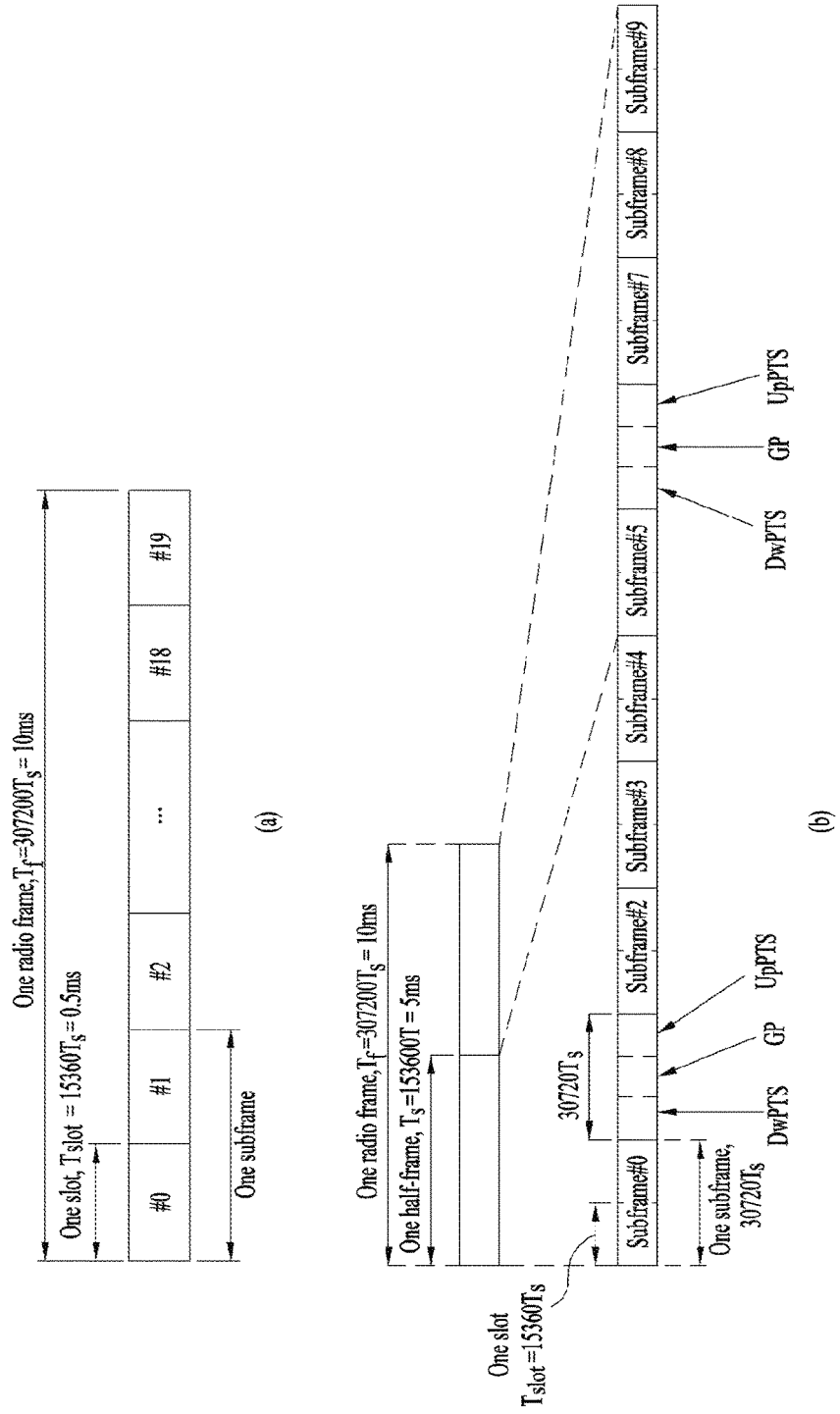
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms(=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
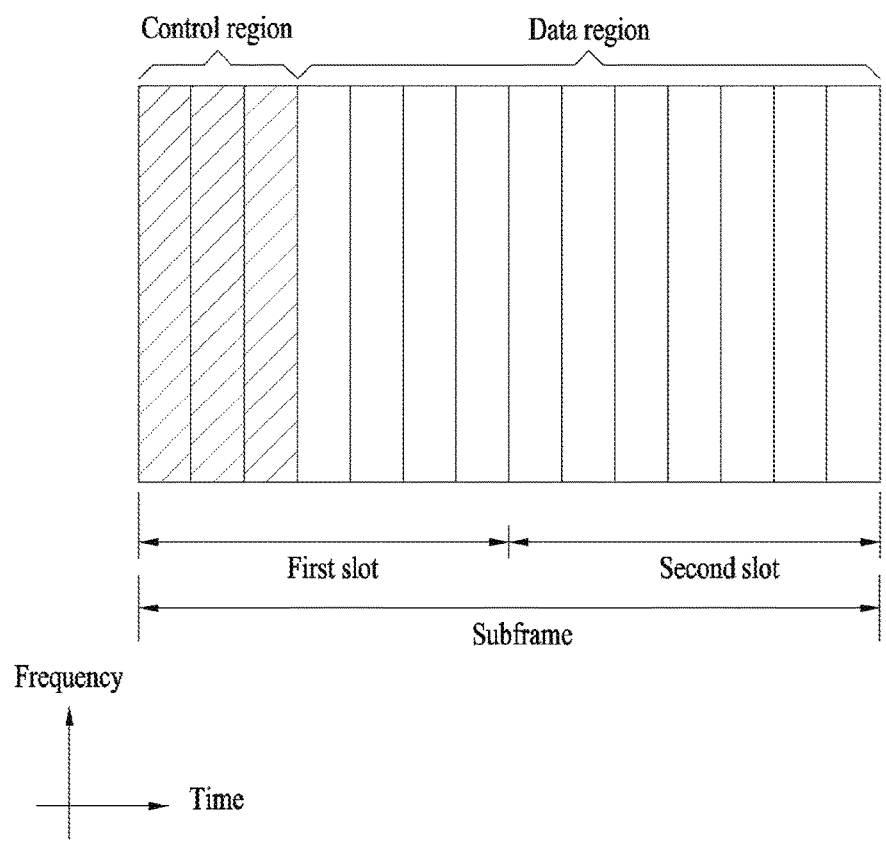
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| | | Normal cyclic prefix in downlink | | | Extended cyclic prefix in downlink | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
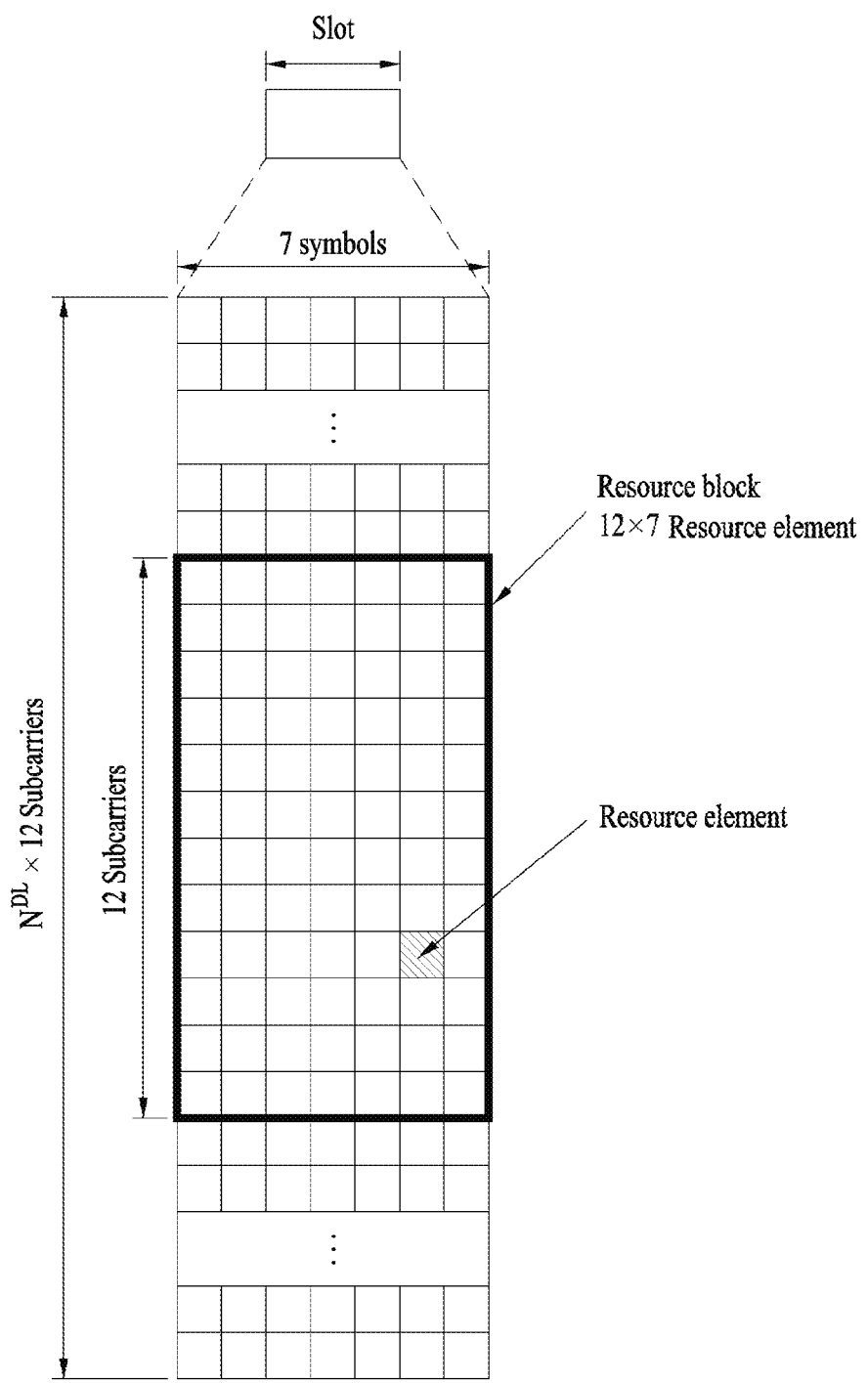
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

FIG. 4 illustrates a structure of a UL subframe which may be used in embodiments of the present disclosure.

Referring to FIG. 4, a UL subframe may be divided into a control region and a data region in the frequency domain.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE($=\lfloor N_{REG}/9 \rfloor$) and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);

(2) Transmission mode 2: Transmit diversity;

(3) Transmission mode 3: Open-loop spatial multiplexing when the number of layer is larger than 1 or Transmit diversity when the rank is 1;

(4) Transmission mode 4: Closed-loop spatial multiplexing;

(5) Transmission mode 5: MU-MIMO;

(6) Transmission mode 6: Closed-loop rank-1 precoding;

(7) Transmission mode 7: Precoding supporting a single layer transmission, which is not based on a codebook (Rel-8);

(8) Transmission mode 8: Precoding supporting up to two layers, which are not based on a codebook (Rel-9);

(9) Transmission mode 9: Precoding supporting up to eight layers, which are not based on a codebook (Rel-10); and

(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting position of a USS.

[Table 4] illustrates the sizes of CSSs and USSs.

TABLE 4

| PDCCH Format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\}+i \quad \text{[Equation 1]}$$

Herein, $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$ $k=\lfloor n_s/2 \rfloor$ where $n_x$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \quad \text{[Equation 2]}$$

Herein, $Y_{-1}=n_{RNTI} \neq 0$, $n_{RNTI}$ indicating an RNTI value. A=39827 and D=65537.

1.3. PUCCH (Physical Uplink Control Channel)

PUCCH may include the following formats to transmit control information.

(1) Format 1: On-Off keying (OOK) modulation, used for SR (Scheduling Request)

(2) Format 1a & 1b: Used for ACK/NACK transmission
  1) Format 1a: BPSK ACK/NACK for 1 codeword
  2) Format 1b: QPSK ACK/NACK for 2 codewords (3) Format 2: QPSK modulation, used for CQI transmission (4) Format 2a & Format 2b: Used for simultaneous transmission of CQI and ACK/NACK (5) Format 3: Used for multiple ACK/NACK transmission in a carrier aggregation environment Table 6 shows a modulation scheme according to PUCCH format and the number of bits per subframe. Table 7 shows the number of reference signals (RS) per slot according to PUCCH format. Table 8 shows SC-FDMA symbol location of RS (reference signal) according to PUCCH format. In Table 6, PUCCH format 2a and PUCCH format 2b correspond to a case of normal cyclic prefix (CP).

TABLE 6

| PUCCH format | Modulation scheme | No. of bits per subframe, Mbit |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

TABLE 7

| PUCCH format | Normal CP | Extended CP |
|---|---|---|
| 1, 1a, 1b | 3 | 2 |
| 2, 3 | 2 | 1 |
| 2a, 2b | 2 | N/A |

TABLE 8

| PUCCH | SC-FDMA symbol location of RS | |
|---|---|---|
| format | Normal CP | Extended CP |
| 1, 1a, 1b | 2, 3, 4 | 2, 3 |
| 2, 3 | 1, 5 | 3 |
| 2a, 2b | 1, 5 | N/A |

Figure 6:
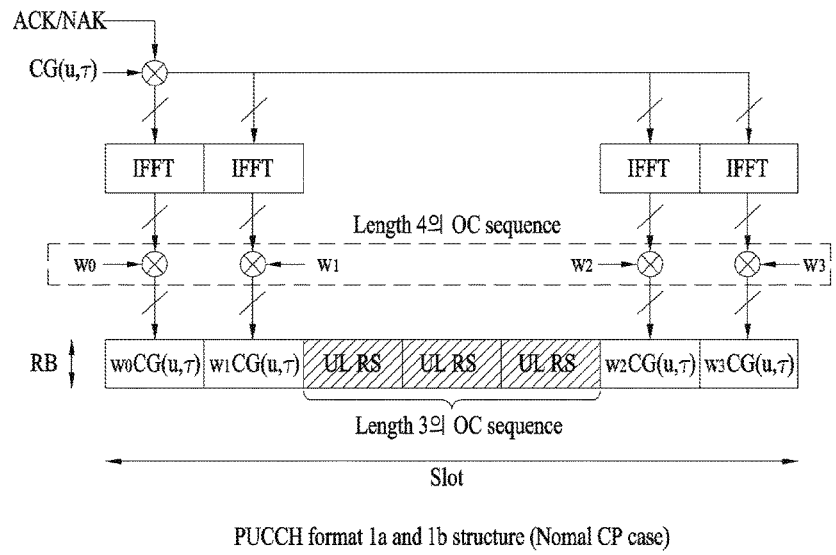
FIG. 6 is a view illustrating Physical Uplink Control Channel (PUCCH) formats 1a and 1b in a normal Cyclic Prefix (CP) case.
Figure 7:
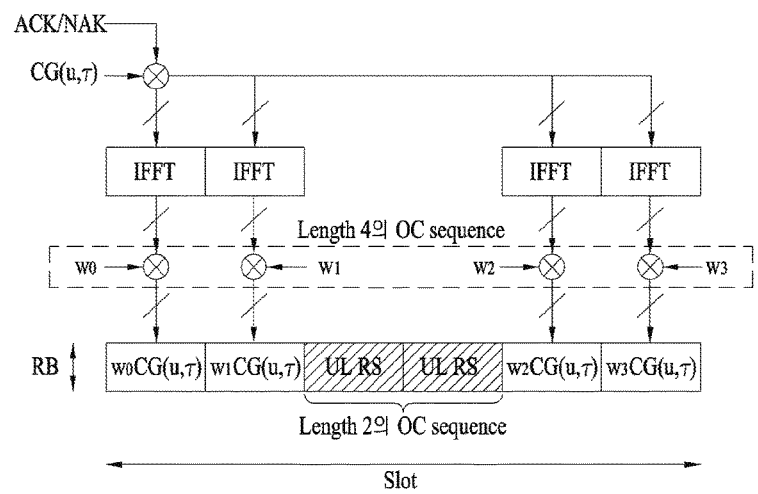
FIG. 7 is a view illustrating PUCCH formats 1a and 1b in an extended CP case.

FIG. 6 shows PUCCH formats 1a and 1b in case of a normal cyclic prefix. And, FIG. 7 shows PUCCH formats 1a and 1b in case of an extended cyclic prefix.

According to the PUCCH formats 1a and 1b, control information of the same content is repeated in a subframe by slot unit. In each user equipment, ACK/NACK signal is transmitted on a different resource constructed with a different cyclic shift (CS) (frequency domain code) and an orthogonal cover (OC) or orthogonal cover code (OCC) (time domain spreading code) of CG-CAZAC (computer-generated constant amplitude zero auto correlation) sequence. For instance, the OC includes Walsh/DFT orthogonal code. If the number of CS and the number of OC are 6 and 3, respectively, total 18 user equipments may be multiplexed within the same PRB (physical resource block) with reference to a single antenna. Orthogonal sequences w0, w1, w2 and w3 may be applicable to a random time domain (after FFT modulation) or a random frequency domain (before FFT modulation).

For persistent scheduling with SR, ACK/NACK resource constructed with CS, OC and PRB (physical resource block) may be allocated to a user equipment through RRC (radio resource control. For non-persistent scheduling with dynamic ACK/NACK, the ACK/NACK resource may be implicitly allocated to a user equipment using a smallest CCE index of PDCCH corresponding to PDSCH.

Length-4 orthogonal sequence (OC) and length-3 orthogonal sequence for PUCCH format 1/1a/1b are shown in Table 9 and Table 10, respectively.

TABLE 9

| Sequence index $n_{oc}$ ($n_s$) | Orthogonal sequences [w(0) ... w($N_{SF}^{PUCCH}$ − 1)] |
|---|---|
| 0 | [+1 +1 +1 +1] |
| 1 | [+1 −1 +1 −1] |
| 2 | [+1 −1 −1 +1] |

TABLE 10

| Sequence index $n_{oc}$ ($n_s$) | Orthogonal sequences [w(0) ... w($N_{SF}^{PUCCH}$ − 1)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequence (OC)[$\overline{w}(0)$ ... $\overline{w}(N_{RS}^{PUCCH}-1)$] for a reference signal in PUCCH format 1/1a/1b is shown in Table 11.

TABLE 11

| Sequence index $\overline{n}_{oc}$($n_s$) | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 8:
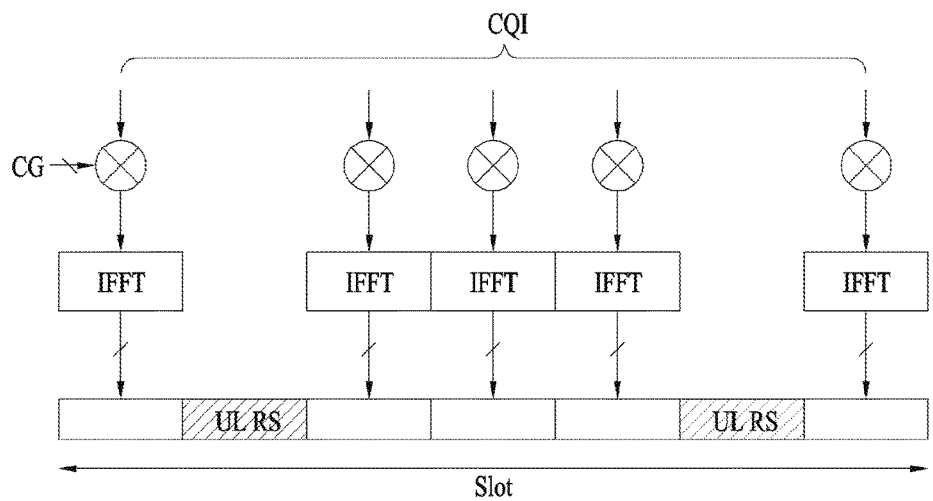
FIG. 8 is a view illustrating PUCCH format 2/2a/2b in the normal CP case.

FIG. 8 shows PUCCH format 2/2a/2b in case of a normal cyclic prefix. And, FIG. 9 shows PUCCH format 2/2a/2b in case of an extended cyclic prefix.

Figure 9:
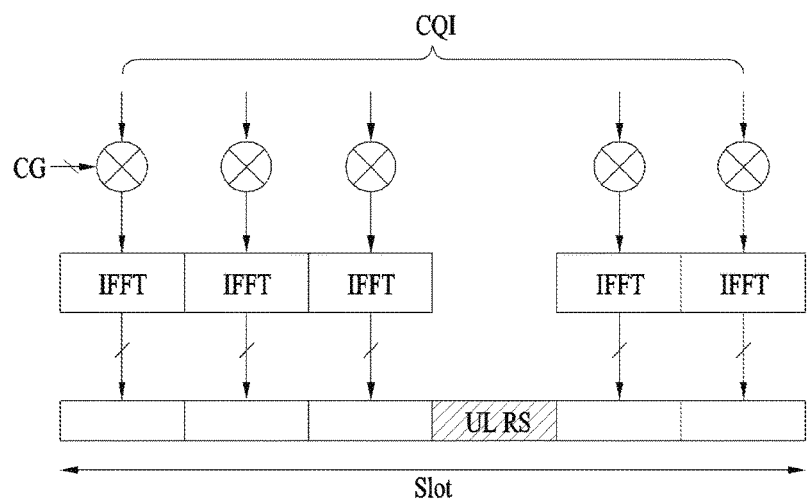
FIG. 9 is a view illustrating PUCCH format 2/2a/2b in the extended CP case.

Referring to FIG. 8 and FIG. 9, in case of a normal CP, a subframe is constructed with 10 QPSK data symbols as well as RS symbol. Each QPSK symbol is spread in a frequency domain by CS and is then mapped to a corresponding SC-FDMA symbol. SC-FDMA symbol level CS hopping may be applied to randomize inter-cell interference. The RS may be multiplexed by CDM using a cyclic shift. For instance, assuming that the number of available CSs is 12, 12 user equipments may be multiplexed in the same PRB. For instance, assuming that the number of available CSs is 6, 6 user equipments may be multiplexed in the same PRB. In brief, a plurality of user equipments in PUCCH format 1/1a/1b and PUCCH format 2/2a/2b may be multiplexed by 'CS+OC+PRB' and 'CS+PRB', respectively.

FIG. 10 is a diagram of ACK/NACK channelization for PUCCH formats 1a and 1b. In particular, FIG. 10 corresponds to a case of '$\Delta_{shift}^{PUCCH}$=2'.

Figure 11:
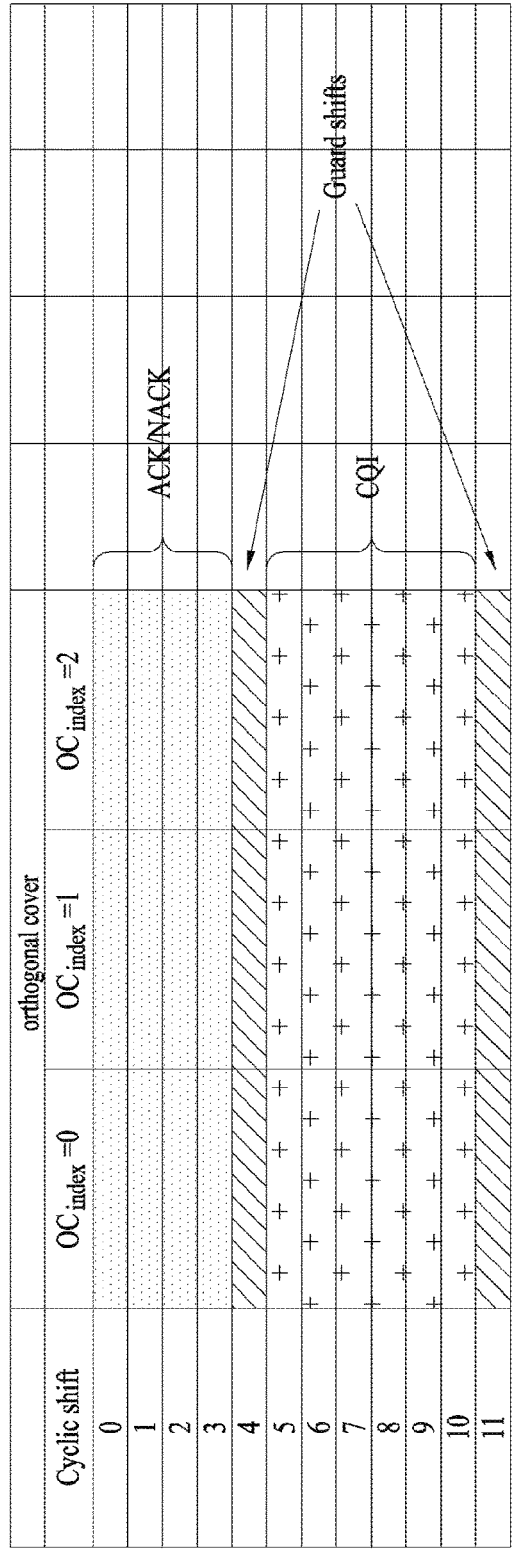
FIG. 11 is a view illustrating channelization for a combined structure of PUCCH format 1a/1b and PUCCH format 2/2a/2b in the same Physical Resource Block (PRB)

FIG. 11 is a diagram of channelization for a hybrid structure of PUCCH format 1/1a/1b and PUCCH format 2/2a/2b.

Cyclic shift (CS) hopping and orthogonal cover (OC) remapping may be applicable in a following manner.

(1) Symbol-based cell-specific CS hopping for randomization of inter-cell interference (2) Slot level CS/OC remapping 1) For inter-cell interference randomization 2) Slot based access for mapping between ACK/NACK channel and resource (k)

Meanwhile, resource $n_r$ for PUCCH format 1/1a/1b may include the following combinations.

(1) CS(=equal to DFT orthogonal code at symbol level) ($n_{cs}$)

(2) OC (orthogonal cover at slot level) ($n_{oc}$)

(3) Frequency RB (Resource Block) ($n_{rb}$)

If indexes indicating CS, OC and RB are set to $n_{cs}$, $n_{oc}$, $n_{rb}$, respectively, a representative index $n_r$ may include $n_{cs}$, $n_{oc}$ and $n_{rb}$. In this case, the $n_r$ may meet the condition of '$n_r=(n_{cs}, n_{oc}, n_{rb})$'.

The combination of CQI, PMI, RI, CQI and ACK/NACK may be delivered through the PUCCH format 2/2a/2b. And, Reed Muller (RM) channel coding may be applicable.

For instance, channel coding for UL (uplink) CQI in LTE system may be described as follows. First of all, bitstreams $a_o, a_1, a_2, a_3, \ldots, a_{A-1}$ may be coded using (20, A) RM code. In this case, $a_o$ and $a_{A-1}$ indicates MSB (Most Significant Bit) and LSB (Least Significant Bit), respectively. In case of an extended cyclic prefix, maximum information bits include 11 bits except a case that QI and ACK/NACK are simultaneously transmitted. After coding has been performed with 20 bits using the RM code, QPSK modulation may be applied. Before the BPSK modulation, coded bits may be scrambled.

Table 12 shows a basic sequence for (20, A) code.

TABLE 12

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |

TABLE 12-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by [Equation 31].

$$b_i = \sum_{n=0}^{A-1}(a_n \cdot M_{i,n}) \bmod 2 \quad \text{[Equation 3]}$$

In [Equation 3], 'i=0, 1, 2, . . . , B−1' is met.

In case of wideband repots, a bandwidth of UCI (uplink control information) field for CQI/PMI can be represented as Tables 8 to 10 in the following.

[Table 13] shows UCI (Uplink Control Information) field for broadband report (single antenna port, transmit diversity) or open loop spatial multiplexing PDSCH CQI feedback.

TABLE 13

| Field | Bandwidth |
|---|---|
| Broadband CQI | 4 |

[Table 14] shows UL control information (UCI) field for CQI and PMI feedback in case of wideband reports (closed loop spatial multiplexing PDSCH transmission).

TABLE 14

| | Bandwidth | | | |
|---|---|---|---|---|
| | 2 antenna ports | | 4 antenna ports | |
| Field | rank = 1 | rank = 2 | rank = 1 | Rank > 1 |
| Wideband CQI | 4 | 4 | 4 | 4 |
| Spatial differential CQI | 0 | 3 | 0 | 3 |
| Precoding Matrix Indication | 2 | 1 | 4 | 4 |

[Table 15] shows UL control information (UCI) field for RI feedback in case of wideband reports.

TABLE 15

| | Bit widths | | |
|---|---|---|---|
| | 2 antenna | 4 antenna ports | |
| Field | ports | Max. 2 layers | Max. 4 layers |
| Rank Indication | 1 | 1 | 2 |

Figure 12:
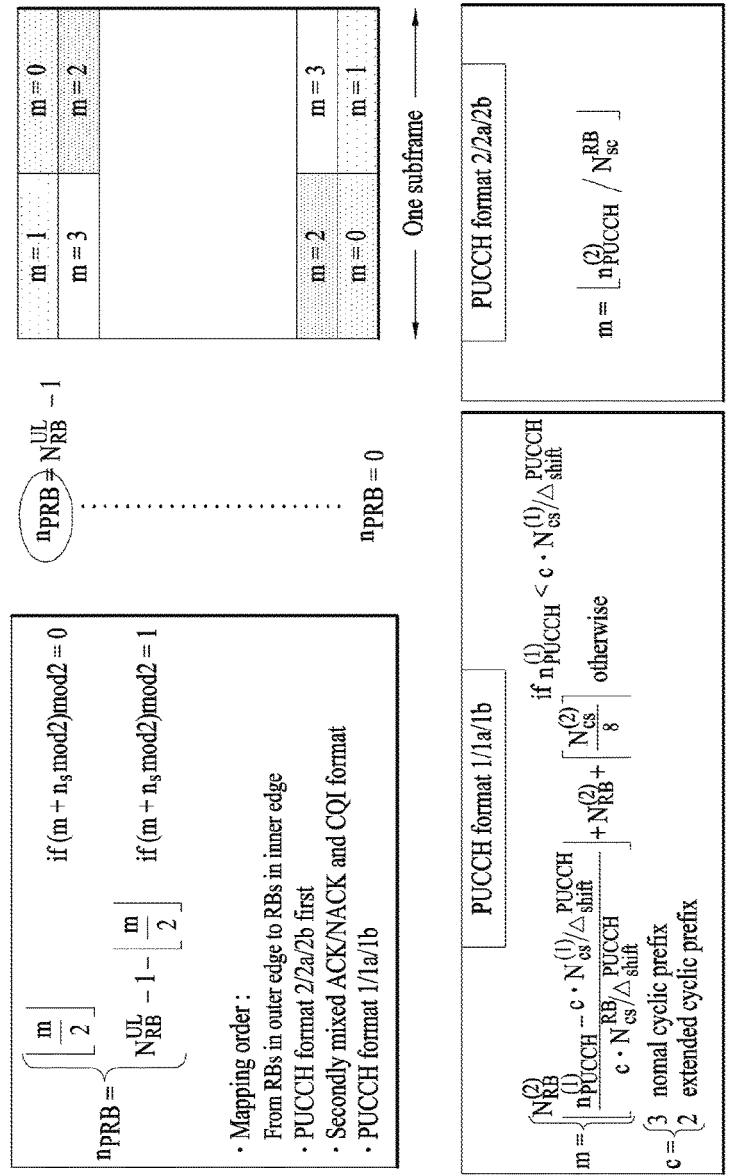
FIG. 12 is a view illustrating a PRB allocation method.

FIG. 12 is a diagram for PRB allocation. Referring to FIG. 20, PRB may be usable for PUCCH transmission in a slot 2. Carrier Aggregation (CA) Environment 2.1 CA Overview A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 13:
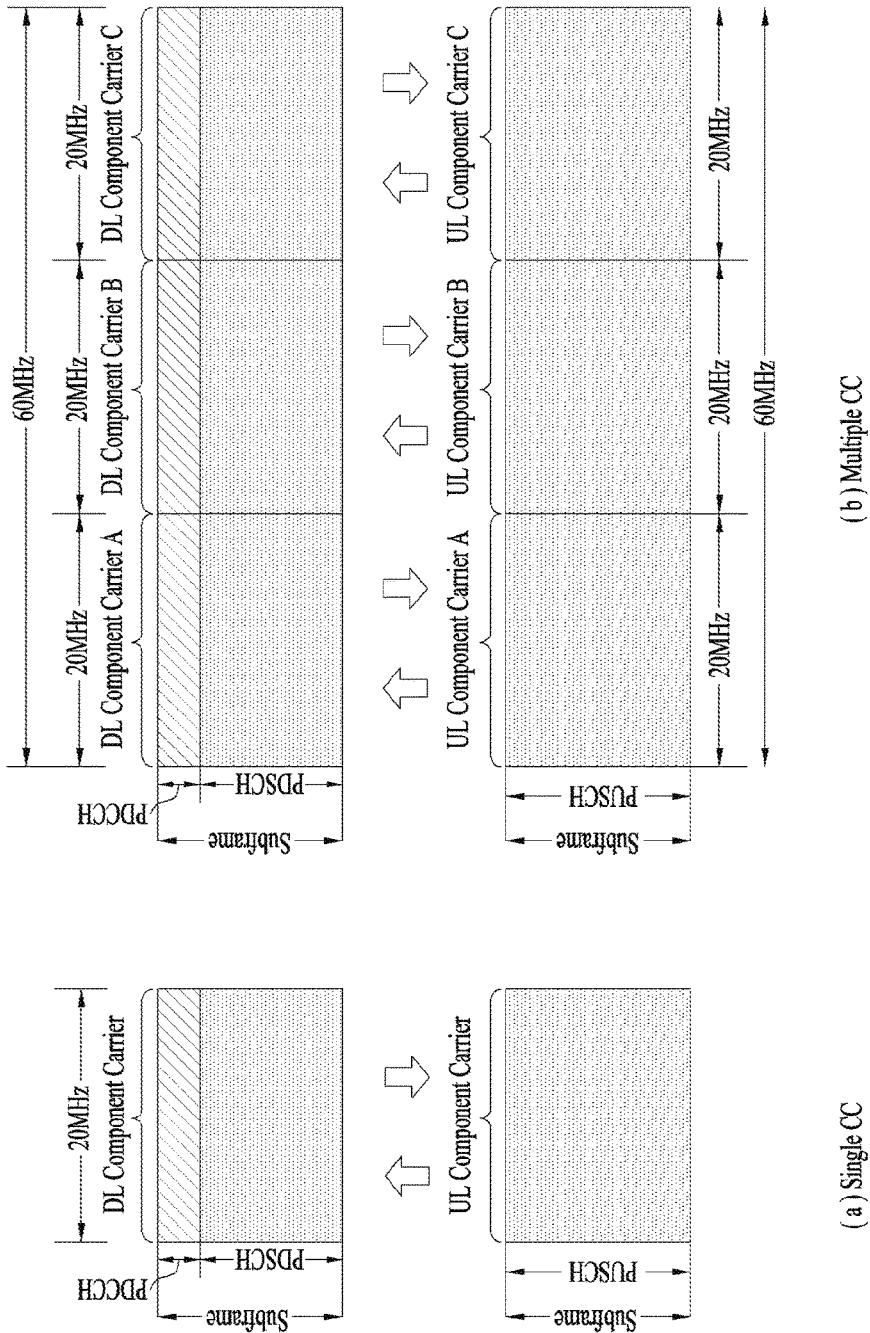
FIG. 13 is a view illustrating exemplary Component Carriers (CCs) and exemplary Carrier Aggregation (CA) in a Long Term Evolution-Advanced (LTE-A) system, which are used in embodiments of the present disclosure.

FIG. 13 illustrates an example of CCs and CA in the LTE-A system, which are used in embodiments of the present disclosure.

FIG. 13(a) illustrates a single carrier structure in the LTE system. There are a DL CC and a UL CC and one CC may have a frequency range of 20 MHz.

FIG. 13(b) illustrates a CA structure in the LTE-A system. In the illustrated case of FIG. 13(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 14:
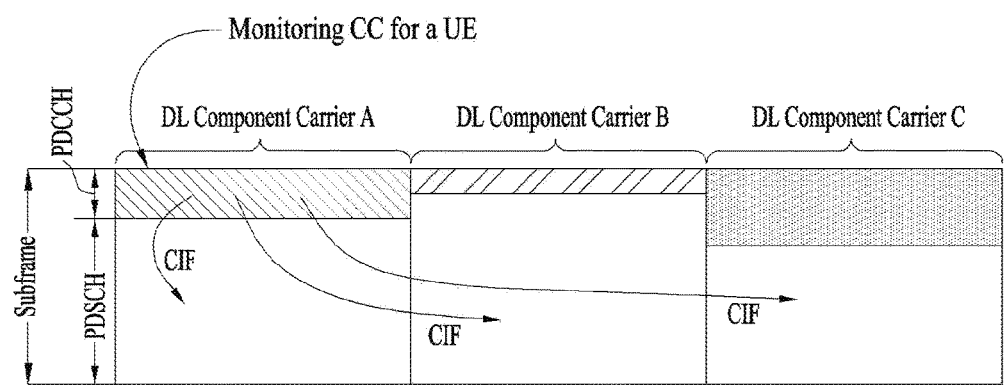
FIG. 14 is a view illustrating a subframe structure based on cross-carrier scheduling in the LTE-A system, which is used in embodiments of the present disclosure.

FIG. 14 illustrates a cross carrier-scheduled subframe structure in the LTE-A system, which is used in embodiments of the present disclosure.

Referring to FIG. 14, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 15:
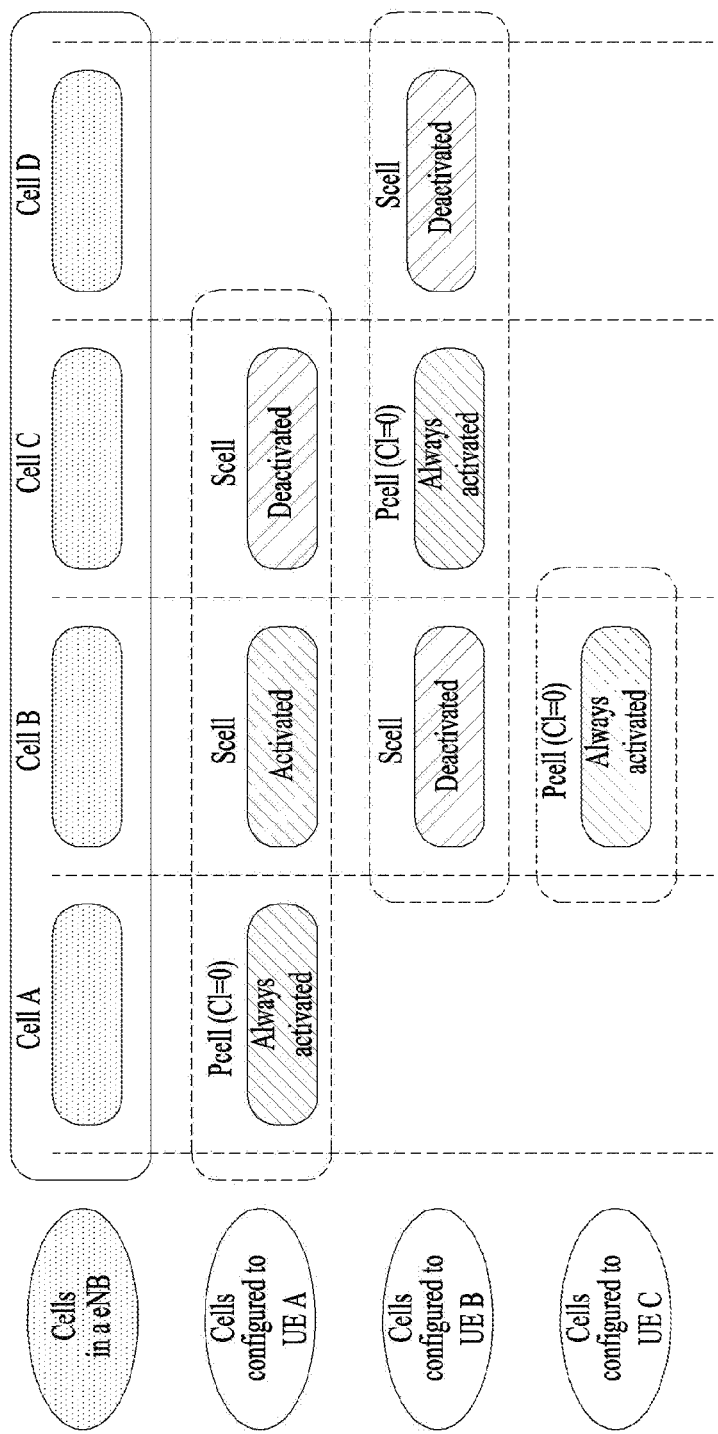
FIG. 15 is a view illustrating an exemplary configuration of serving cells according to cross-carrier scheduling used in embodiments of the present disclosure.

FIG. 15 is conceptual diagram illustrating a construction of serving cells according to cross-carrier scheduling.

Referring to FIG. 15, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and S Cell may be activated or deactivated by the eNB and/or UE.

The cells shown in FIG. 15 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

3. Method for Feeding Back Channel State Information (CSI)

3.1 Channel State Information (CSI)

First of all, in the 3GPP LTE system, when a DL reception entity (e.g., a user equipment) is connected to a DL transmission entity (e.g., a base station), the DL reception entity performs measurement on a reference signal received power (RSRP) of a reference signal transmitted in DL, a quality of a reference signal (RSRQ: reference signal received quality) and the like at a random time and is then able to make a periodic or even-triggered report of a corresponding measurement result to the base station.

Each user equipment reports a DL channel information in accordance with a DL channel status via uplink. A base station is then able to determine time/frequency resources, MCS (modulation and coding scheme) and the like appropriate for a data transmission to each user equipment using the DL channel information received from the each user equipment.

Such channel state information (CSI) may include CQI (Channel Quality Indication), PMI (Precoding Matrix Indicator), PTI (Precoder Type Indication) and/or RI (Rank Indication). In particular, the CSI may be transmitted entirely or partially depending on a transmission mode of each user equipment. CQI is determined based on a received signal quality of a user equipment, which may be generally determined on the basis of a measurement of a DL reference signal. In doing so, a CQI value actually delivered to a base station may correspond to an MCS capable of providing maximum performance by maintaining a block error rate (BLER) under 10% in the received signal quality measured by a user equipment.

This channel information reporting may be classified into a periodic report transmitted periodically and an aperiodic report transmitted in response to a request made by a base station.

In case of the aperiodic report, it is set for each user equipment by a 1-bit request bit (CQI request bit) contained in UL scheduling information downloaded to a user equipment by a base station. Having received this information, each user equipment is then able to deliver channel information to the base station via a physical uplink shared channel (PUSCH) in consideration of its transmission mode. And, it may set RI and CQI/PMI not to be transmitted on the same PUSCH.

In case of the periodic report, a period for transmitting channel information via an upper layer signal, an offset in the corresponding period and the like are signaled to each user equipment by subframe unit and channel information in consideration of a transmission mode of each user equipment may be delivered to a base station via a physical uplink control channel (PUCCH) in accordance with a determined period. In case that data transmitted in uplink simultaneously exists in a subframe in which channel information is transmitted by a determined period, the corresponding channel information may be transmitted together with the data not on the physical uplink control channel (PUCCH) but on a physical uplink shared channel (PUSCH). In case of the periodic report via PUCCH, bits (e.g., 11 bits) limited further than those of the PUSCH may be used. RI and CQI/PMI may be transmitted on the same PUSCH.

In case that contention occurs between the periodic report and the aperiodic report in the same subframe, only the aperiodic report can be performed.

In calculating Wideband CQI/PMI, a most recently transmitted RI may be usable. RI in a PUCCH CSI report mode is independent from RI in a PUSCH CSI report mode. The RI in the PUSCH CSI report mode is valid for CQI/PMI in the corresponding PUSCH CSI report mode only.

Table 16 is provided to describe CSI feedback type transmitted on PUCCH and PUCCH CSI report mode.

TABLE 16

| | | PMI Feedback Type | |
|---|---|---|---|
| | | No PMI (OL, TD, single-antenna) | Single PMI (CL) |
| CQI | Wideband | Mode 1-0 | Mode 1-1 |
| Feedback Type | | RI (only for Open-Loop SM) One Wideband CQI (4 bit) when RI > 1, CQI of first codeword | RI Wideband CQI (4 bit) Wideband spatial CQI (3 bit) for RI > 1 Wideband PMI (4 bit) |
| | UE | Mode 2-0 | Mode 2-1 |
| | Selected | RI (only for Open-Loop SM) Wideband CQI (4 bit) Best-1 CQI (4 bit) in each BP Best-1 indicator(L-bit label) when RI > 1, CQI of first codeword | RI Wideband CQI (4 bit) Wideband spatial CQI (3 bit) for RI > 1 Wideband PMI (4 bit) Best-1 CQI (4 bit) 1 in each BP Best-1 spatial CQI (3 bit) for RI > 1 Best-1 indicator (L-bit label) |

Referring to [Table 16], in the periodic report of channel information, there are 4 kinds of reporting modes (mode 1-0, mode 1-2, mode 2-0 and mode 2-1) in accordance with CQI and PMI feedback types.

CQI can be classified into WB (wideband) CQI and SB (subband) CQI in accordance with CQI feedback type and PMI can be classified into No PMI or Single PMI in accordance with a presence or non-presence of PMI transmission. In Table 11, No PMI corresponds to a case of open-loop (OL), transmit diversity (TD) and single-antenna, while Single PMI corresponds to a case of closed-loop (CL).

Mode 1-0 corresponds to a case that WB CQI is transmitted in the absence of PMI transmission. In this case, RI is transmitted only in case of open-loop (OL) spatial multiplexing (SM) and one WB CQI represented as 4 bits can be transmitted. If RI is greater than 1, CQI for a $1^{st}$ codeword can be transmitted.

Mode 1-1 corresponds to a case that a single PMI and WB CQI are transmitted. In this case, 4-bit WB CQI and 4-bit WB PMI can be transmitted together with RI transmission. Additionally, if RI is greater than 1, 3-bit WB (wideband) spatial differential CQI can be transmitted. In 2-codeword transmission, the WB spatial differential CQI may indicate a difference value between a WB CQI index for codeword 1 and a WB CQI index for codeword 2. The difference value in-between may have a value selected from a set {−4, −3, −2, −1, 0, 1, 2, 3} and can be represented as 3 bits.

Mode 2-0 corresponds to a case that CQI on a UE-selected band is transmitted in the absence of PMI transmission. In this case, RI is transmitted only in case of open-loop spatial multiplexing (SM) and a WB CQI represented as 4 bits may be transmitted. A best CQI (best-1) is transmitted on each bandwidth part (BP) and the best-1 CQI may be represented as 4 bits. And, an L-bit indicator indicating the best-1 may be transmitted together. If the RI is greater than 1, a CQI for a $1^{st}$ codeword can be transmitted.

And, Mode 2-1 corresponds to a case that a single PMI and a CQI on a UE-selected band are transmitted. In this case, together with RI transmission, 4-bit WB CQI, 3-bit WB spiral differential CQI and 4-bit WB PMI can be transmitted. Additionally, 4-bit best-1 CQI is transmitted on each bandwidth part (BP) and L-bit best-1 indicator can be transmitted together. Additionally, if RI is greater than 1, 3-bit best-1 spatial differential CQI can be transmitted. In 2-codeword transmission, it may indicate a difference value between a best-1 CQI index of codeword 1 and a best-1 CQI index of codeword 2.

For the transmission modes, periodic PUCCH CSI report modes are supported as follows.

1) Transmission mode 1: Modes 1-0 and 2-0
2) Transmission mode 2: Modes 1-0 and 2-0
3) Transmission mode 3: Modes 1-0 and 2-0
4) Transmission mode 4: Modes 1-1 and 2-1
5) Transmission mode 5: Modes 1-1 and 2-1
6) Transmission mode 6: Modes 1-1 and 2-1
7) Transmission mode 7: Modes 1-0 and 2-0
8) Transmission mode 8: Modes 1-1 and 2-1 if a user equipment is set to make a PMI/RI reporting, or Modes 1-0 and 2-0 if a user equipment is set not to make a PMI/RI reporting
9) Transmission mode 9: Modes 1-1 and 2-1 if a user equipment is set to make a PMI/RI reporting and the number of CSI-RS ports is greater than 1, or Modes 1-0 and 2-0 if a user equipment is set not to make a PMI/RI reporting and the number of CSI-RS port(s) is equal to 1.

The periodic PUCCH CSIU reporting mode in each serving cell is set by upper layer signaling. And, Mode 1-1 is set to either submode 1 or submode 2 by an upper layer signaling using a parameter 'PUCCH_format1-1_CSI_reporting_mode'.

A CQI reporting in a specific subframe of a specific serving cell in a UE-selected SB CQI means a measurement of at least one channel state of a Bandwidth Part (BP) corresponding to a portion of a bandwidth of a serving cell. An index is given to the bandwidth part in a frequency increasing order starting with a lowest frequency without an increment of a bandwidth.

3.2 CSI Feedback method

In an LTE system, an open-loop MIMO scheme operated without channel information and a closed-loop MIMO scheme operated based on channel information are used. Especially, according to the closed-loop MIMO scheme, each of a transmitter and a receiver may be able to perform beamforming based on channel information (e.g., CSI) to obtain a multiplexing gain of MIMO antennas. To obtain CSI, the eNB allocates a physical uplink control channel (PUCCH) or a physical uplink shared channel (PUSCH) to the UE and instructs the UE to feed back CSI of a downlink channel.

CSI includes Rank Indicator (RI) information, Precoding Matrix Indicator (PMI) information, and Channel Quality Indicator (CQI) information. First, RI indicates rank information of a channel and means the number of data streams that can be received by the UE via the same frequency-time resource. Since RI is dominantly determined by long-term fading of a channel, this may be generally fed back from the UE to the eNB at a cycle longer than that of PMI or CQI. PMI is a value to which the spatial characteristic of a channel is reflected. PMI indicates a precoding index of the eNB preferred by the UE based on a metric of signal-to-interference plus noise ratio (SINR). Lastly, CQI is information indicating the strength of a channel and generally indicates a reception SINR obtainable when the eNB uses PMI.

In an advanced system such as an LTE-A system, a method for obtaining additional multi-user diversity using multi-user MIMO (MU-MIMO) was added. Higher accuracy is required in terms of channel feedback. Since an interference channel exists between UEs multiplexed in an antenna domain in MU-MIMO, the accuracy of CSI may significantly affect interference with other multiplexed UEs as well as a UE for performing feedback. Accordingly, in an LTE-A system, in order to increase accuracy of a feedback channel, a final PMI has been determined to be separately designed as a long-term and/or wideband PMI, W1, and a short-term and/or subband PMI, W2.

The eNB can transform a codebook using a long-term covariance matrix of a channel as shown in Equation 4 below as an example of a hierarchical codebook transformation method configuring one final PMI from two types of channel information such as W1 and W2.

$$W = \text{norm}(W1|W2) \quad \text{[Equation 4]}$$

In [Equation 4], W1 (that is, long-term PMI) and W2 (that is, short-term PMI) denote codewords of a codebook generated in order to reflect channel information, W denotes a codeword of a final transformed codebook, and norm(A) denotes a matrix obtained by normalizing the norm of each column of a matrix A to 1.

In [Equation 4], the structures of W1 and W2 are shown in [Equation 5] below.

$$W1(i) = \begin{bmatrix} X_i & 0 \\ 0 & X_i \end{bmatrix}, \text{ where } X_i \text{ is } Nt/2 \text{ by } M \text{ matrix.} \quad \text{[Equation 5]}$$

$$W2(j) = \begin{bmatrix} e_M^k & e_M^l & e_M^m \\ & \cdots & \\ \alpha_j e_M^k & \beta_j e_M^l & \gamma_j e_M^m \end{bmatrix} \overset{r \text{ columns}}{} \text{ (if rank = }r\text{),}$$

where $1 \le k, l, m \le M$ and $k, l, m$ are integer.

The codeword structures of W1 and W2 shown in [Equation 5] are designed by reflecting correlation characteristics of the channel generated when a cross-polarized antenna is used and a gap between antennas is narrow (e.g., a distance between adjacent antennas is equal to or less than half a signal wavelength).

The cross-polarized antennas may be divided into a horizontal antenna group and a vertical antenna group. At this time, each antenna group has a uniform linear array (ULA) antenna property and two antenna groups are co-located. Accordingly, the correlations between antennas in each group have the same linear phase increment property and the correlation between the antenna groups has a phase rotation property.

Since a codebook is a value obtained by quantizing radio channels, a codebook may be designed by reflecting the characteristics of a channel corresponding to a source without change. Equation 6 below shows an example of a rank-1 codeword designed using the structures of Equations 4 and 5, for convenience of description. Referring to Equation 6, it can be seen that such channel properties are reflected to the codeword satisfying Equation 4.

$$W1(i) * W2(j) = \begin{bmatrix} X_i(k) \\ \alpha_j X_i(k) \end{bmatrix} \quad \text{[Equation 6]}$$

In [Equation 6], a codeword is expressed as an $N_t$ (that is, the number of transmit antennas)×1 vector. At this time, Equation 6 is composed of an upper vector $X_i(k)$ and a lower vector $\alpha_j X_i(k)$, which respectively represent the correlation characteristics of the horizontal and vertical antenna groups. At this time, $X_i(k)$ is expressed as a vector having the linear phase increment property by reflecting the correlation characteristics between antenna groups. A representative example thereof includes a discrete Fourier transform (DFT) matrix.

In addition, higher channel accuracy is necessary for CoMP. For example, CoMP joint transmission (JP) may be theoretically regarded as a MIMO system in which antennas are geographically distributed, because several eNBs cooperatively transmit the same data to a specific UE. That is, even when MU-MIMO is implemented in JT, very high channel accuracy is required to avoid interference between UEs scheduled together, similarly to single cell MU-MIMO operation. Even in CoMP coordinated beamforming (CB), precise channel information is required to avoid interference with a serving cell caused by a neighbor cell.

3.3 UE Operation for CSI Reporting

Time and frequency resources used by the UE to report CSI including CQI, PMI, precoding type indicator (PTI) and/or RI are scheduled by the eNB. For spatial multiplexing (SM), the UE shall determine RI corresponding to the number of transmission layers. For transmit diversity, the UE sets RI to 1.

A UE in transmission mode 8 or 9 is configured with or without PMI/RI reporting by a higher layer parameter pmi-RI-report. A UE is configured with resource-restricted CSI measurements if subframe sets $C_{CSI,0}$ and $C_{CSI,1}$ are configured by a higher layer.

When a UE is configured with one or more serving cells, the UE performs a CSI reporting only for activated serving cells. When the UE is not configured for simultaneous PUSCH and PUCCH transmission, the UE periodically performs CSI reporting on the PUCCH in the subframe with no PUSCH allocation. When the UE is not configured for simultaneous PUSCH and PUCCH transmission, the UE performs periodic CSI reporting in a subframe to which the PUSCH of a serving cell having a smallest serving cell index ServCellIndex is allocated. At this time, the UE uses the same format as the PUCCH-based periodic CSI reporting format on the PUSCH. Under a predetermined condition, the UE transmits periodic CSI reporting on the PUSCH. For example, for aperiodic CQI/PMI reporting, RI reporting is transmitted only when the configured CSI feedback type supports RI reporting.

In addition, even when the UE periodically performs CSI reporting, the UE may aperiodically perform CSI reporting when UL grant, in which a CSI request field is set, is received from the eNB.

3.3.1 Aperiodic CSI Reporting Using PUSCH

The UE performs aperiodic CSI reporting using the PUSCH in a subframe n+k, upon receiving an uplink DCI format (that is, UL grant) or random access response grant, in which a CSI request field is set, in a subframe n of a serving cell c. When the CSI request field has 1 bit and is set to "1", the CSI reporting request is triggered for the serving cell c. When the CSI request field has 2 bits, the CSI reporting request is triggered according to Table 17 below.

TABLE 17

| Value of CSI request field | Description |
| --- | --- |
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for $2^{nd}$ set of serving cells configured by higher layers |

In [Table 17], the CSI request field set to "00" indicates that no aperiodic CSI report is triggered, "01" indicates that the aperiodic CSI report is triggered for the serving cell c, "10" indicates that the aperiodic CSI report is triggered for a first set of serving cells configured by higher layers, and "11" indicates that the aperiodic CSI report is triggered for a second set of serving cells configured by higher layers.

A UE is not expected to receive more than one aperiodic CSI report request for a given subframe.

[Table 18] below lists reporting modes for CSI transmission on a PUSCH.

TABLE 18

| | | PMI feedback type | |
| --- | --- | --- | --- |
| | | No PMI | Single PMI | Multiple PMI |
| PUSCH CQI feedback type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

Transmission modes listed in [Table 18] are selected by a higher layer, and a CQI, a PMI, and an RI are transmitted in the same PUSCH subframe. A detailed description will be given of each reporting mode.

1-1) Mode 1-2

A UE selects a precoding matrix for each subband on the assumption that data is transmitted only in the subband. The UE generates CQI on the assumption of a previously selected precoding matrix for a system band or all bands (set S) indicated by the higher layer. Further, the UE transmits the CQI and a PMI for each subband. Herein, the size of each subband may vary with the size of the system band.

1-2) Mode 2-0

The UE selects M preferred subbands for a system band or a band (set S) indicated by the higher layer. The UE generates one CQI on the assumption that data is transmitted in the selected M subbands. The UE additionally generates one wideband CQI for the system band or the set S. If there are a plurality of codewords for the selected M subbands, the UE defines a CQI for each codeword as a differential value. Herein, differential CQIs are set to values obtained by subtracting a wideband CQI index from indexes corresponding to CQIs for the selected M subbands.

The UE transmits information about the positions of the selected M subbands, one CQI for the selected M subbands, and a CQI for the total band or the set S. Herein, the size of a subband and M may vary with the size of the system band.

1-3) Mode 2-2

The UE simultaneously selects the positions of M preferred subbands and a single precoding matrix for the M preferred subbands on the assumption that data is transmitted in the M preferred subbands. Herein, a CQI is defined per codeword for the M preferred subbands.

The UE additionally generates a wideband CQI for the system band or the set S.

The UE transmits information about the positions of the M preferred subbands, one CQI for the M selected subbands, a single precoding matrix index for the M preferred subbands, a wideband precoding matrix index, and a wideband CQI. Herein, the size of a subband and M may vary with the size of the system band.

1-4) Mode 3-0

The UE generates and reports a wideband CQI.

The UE generates a CQI for each subband on the assumption that data is transmitted in the subband. Herein, even though an RI>1, a CQI represents only a CQI value for a first codeword.

1-5) Mode 3-1

The UE generates a single precoding matrix for the system band or the set S.

The UE generates a subband CQI per codeword on the assumption of a previously generated single precoding matrix for each subband.

The UE generates a wideband CQI on the assumption of a single precoding matrix. Herein, a CQI for each subband is expressed as a differential value. For example, a subband CQI is defined as a value obtained by subtracting a wideband CQI index from a subband CQI index (Subband CQI=subband CQI index-wideband CQI index). Also, the size of a subband may vary with the size of the system band.

4. CSI Feedback Method of MTC UE

4.1 MTC UE

MTC refers to communication between machines without human intervention. MTC may diversify services and related terminals. At present, an MTC service field considered most promising is smart metering. A smart meter used for smart metering is at once a measuring device for measuring an amount of using electricity, water, gas, etc. and a transmission device for transmitting various related information through a communication network.

For example, the smart meter transmits an amount of using electricity, water, gas, etc. periodically or aperiodically to a management center through a communication network. The communication network may use a licensed band such as a cellular network or an unlicensed band such as a Wi-Fi network. The present invention considers MTC communication over an LTE network which is one of cellular networks.

Regarding an MTC service, a UE should transmit data to an eNB periodically. Although a data transmission period is different according to a setting of a service provider, it is assumed that the data transmission period is very long. Meanwhile, the basic operation of an MTC UE supporting smart metering is to measure electricity, gas, and water. Therefore, the smart meter (i.e., the MTC UE) may be installed in a poorer environment than a general terminal. For example, the smart meter may be installed in a poor communication environment such as a baseband or a shielded place according to a housing type. However, since such an MTC UE does not require a high data rate and has only to satisfy a low data rate with long periodicity, additional installation of a relay or an eNB to improve the poor communication environment of the MTC UE may not be cost-effective. Accordingly, it is preferred to support MTC UEs by utilizing existing networks as much as possible.

The simplest method for overcoming a poor communication environment of an MTC UE is that the MTC UE repeatedly transmits the same data. CSI feedback methods of an MTC UE supporting repeated transmission for a DL physical channel and/or a UL physical channel according to embodiments of the present invention will be described.

In embodiments of the present invention, it is assumed that repeated transmission is supported for a PDSCH used for DL data transmission. According to the current LTE-A (e.g., Release-11) standard, CSI feedback for PDSCH transmission may be divided into periodic CSI transmission on a PUCCH and aperiodic CSI transmission on a PUSCH.

The size of payload to be transmitted on a PUCCH or a PUSCH by a UE varies according to a CSI feedback mode (i.e., reporting mode). As the payload is larger, the UE needs greater transmission power to report CSI. Therefore, for efficient power use of the MTC UE, it is necessary to minimize content that the MTC UE will transmit. Accordingly, when the MTC UE feeds back CSI, the MTC UE is preferably configured to report only necessary information of the CSI.

Now, a description will be given of various methods for feeding back CSI by an MTC UE.

4.2 Repeated Transmissions of Periodic CSI on PUCCH

A method for repeatedly transmitting periodic CSI on a PUCCH by an MTC UE will be described. Regarding periodic CSI feedback on a PUCCH, a higher layer of a UE and/or a network may configure repeated CSI feedback. For PUCCH-related CSI feedback, refer to Sections 1.3, 2.3, and 3.

In embodiments of the present invention, only part of CSI content that is supposed to be a CSI feedback transmitted on a PUCCH may be fed back. For example, only a wideband CQI out of the CSI content may be determined to be a CSI feedback. Since an MTC UE is likely to be installed in a poor communication environment and requirements for the MTC UE are low cost and low-power operation, the MTC UE may have only one antenna. Therefore, a rank is always set to 1, which obviates the need for the MTC UE to feed back an RI for a rank to an eNB, compared to a UE in a general cellular network.

Further, if MIMO is not applied, for example, spatial multiplexing is used, there is no need for feeding back a PMI. Accordingly, the MTC UE is preferably configured to feed back only CQI information, particularly a wideband CQI to the eNB. Or the MTC UE may be configured to transmit only a wideband CQI and a wideband PMI. However, CSI content fed back by the MTC UE may be changed according to requirements for a system environment or a user. Even in this case, it is preferred to limit CSI content transmitted by the MTC UE.

The eNB may indicate a repetition number and PUCCH resources to be used for repeated transmission to the MTC UE by RRC signaling, L1 signaling on a PDCCH/EPDCCH, or MAC signaling. Herein, the MTC UE may repeatedly transmit a PUCCH signal including CSI in the following methods.

(1) Method 1

As defined in the LTE-A (Rel-11) standard, a PUCCH resource region and a CSI content (CQI/PMI/RI) transmission period indicated by a higher layer may still be used, and the same CSI content may be transmitted as many times as a repetition number.

(2) Method 2

The UE may transmit the same CSI content on a PUCCH as many successive subframes as a repetition number from an initial transmission time, using a PUCCH resource region indicated by the higher layer. The transmission period of the CSI is preferably set to be larger than the repetition number, and otherwise, the UE does not perform CSI feedback. This is because if the CSI repetition number is smaller than the transmission period, other CSI content should be transmitted during repeated CSI transmission and thus CSI may collide.

(3) Method 3

In the case where a PUCCH signal is transmitted repeatedly, a PUCCH resource region to be used for repeated transmission (a first resource region) and a PUCCH resource region to be used for non-repeated transmission (a second resource region) may be predetermined. If the UE transmits a PUCCH signal repeatedly, the UE performs CSI feedback in the first resource region. If the UE transmits a PUCCH signal non-repeatedly, the UE performs CSI feedback in the second resource region. All or a part of PUCCH resources configured according to whether a PUCCH signal is repeatedly transmitted may overlap.

4.3 CSI Measurement Resource

For CSI feedback, the UE performs CSI measurement on CSI reference resources using DL Cell specific Reference Signal (CRS) or CSI-RS. The CSI reference resources refer to a valid DL subframe for CSI measurement or CRSs or CSI-RSs transmitted in the valid DL subframe.

The CSI reference resources are defined as a group of DL physical resource blocks corresponding to a band related to a CQI value derived in the frequency domain. Also, the CSI reference resources are defined as a single DL subframe $n-n_{CQI\_ref}$ in the time domain. For periodic CSI reporting, $n_{CQI\_ref}$ is a smallest value equal to or larger than 4 corresponding to a valid DL subframe. For aperiodic CSI report, $n_{CQI\_ref}$ represents reference resources within the same valid DL subframe corresponding to a CSI request of a UL DCI format. Or for aperiodic CSI reporting, $n_{CQI\_ref}$ is equal to 4, and DL subframe $n-n_{CQI\_ref}$ corresponds to a valid DL subframe.

In embodiments of the present invention, when a UE and/or an eNB configures CSI reference resources for a CSI feedback, repeated transmission of the CSI feedback may be considered.

If repeated transmission of a CSI feedback is not allowed, CSI reference resources may be configured to be a latest valid DL subframe among DL subframes earlier than a subframe to carry a CSI report by four subframes (n-4), for UL subframe n to carry a PUCCH signal and/or a PUSCH signal.

On the other hand, if repeated transmission of a CSI feedback is allowed, there is no need for performing CSI measurement for CSI feedback during a repeated transmission period. Therefore, if repeated transmission of a CSI feedback is allowed, CSI reference resources are defined as a latest valid DL subframe among DL subframes earlier than UL subframe n by four subframes, after repeated transmission of the previous PUCCH signal.

Herein, DL subframes that fall into a time period of repeated transmission of a CSI feedback are not configured as valid DL subframes for CSI measurement. Therefore, if the UE repeatedly transmits CSI, the UE measures CSI in a latest valid DL subframe among DL subframes four subframes earlier than subframe n in which repeated transmission starts.

In the case where a CSI subframe set is configured and CSI feedback is performed through restrictive CSI measurement in the subframe set, if a DL subframe of the CSI subframe set is included in a repeated transmission period, the UE does not perform CSI measurement and CSI feedback in the DL subframe.

Meanwhile, the quality of CSI measured in CSI reference resources of a single DL subframe may be poor due to a poor propagation environment. Therefore, when CSI reference resources are defined, CSI reference resources may be configured in set of a plurality of DL subframes (contiguous or non-contiguous DL subframes). The UE measures CSI in the plurality of DL subframes and then feed back the CSI to the eNB.

The UE may measure CSI using CRSs or CSI-RSs in a plurality of DL subframes. To indicate the plurality of DL subframes to the UE, the eNB may transmit, by higher layer signaling (e.g., a MC signal or an RRC signal) (1) the indexes of the plurality of DL subframes in a bitmap, (2) the index of a first DL subframe and information about the number or length of the DL subframes, or (3) the indexes of a first DL subframe and a last DL subframe.

4.4 Repeated Transmissions of Periodic CSI on PUSCH 4.4.1 Repeated Transmissions of PDCCH Signal In an LTE-A (e.g., Rel-11) system, aperiodic CSI reporting is triggered by a PDCCH signal. That is, the UE transmits an aperiodic CSI feedback to the eNB on a PUSCH four DL subframes after receiving a PDCCH signal including an aperiodic CSI request field (refer to [Table 17]). For PUSCH-related CSI feedback, refer to Sections 1.3, 2.3, and 3.

In embodiments of the present invention, to enable the MTC UE to perform CSI feedback stably, repeated transmission of a PDCCH signal may be allowed. The aperiodic CSI request field included in the PDCCH signal may also be repeatedly transmitted. The UE transmits a PUSCH signal including aperiodic CSI to the eNB a predetermined number of subframes (e.g. four subframes) after receiving the last of repeatedly transmitted PDCCH signals.

For stable transmission of the PUSCH signal including the aperiodic CSI, the PUSCH signal may be transmitted repeatedly as many times as the number of repeatedly transmitted PDCCH signals or a predetermined number.

4.4.2 Repeated Transmissions of PDSCH Signal

The MTC UE is likely to be installed in a poor communication environment. Therefore, it may be preferable to transmit the same PDSCH signal repeatedly, not once to the MTC UE.

If a PDSCH signal is repeatedly transmitted to the MTC UE, it is preferable not to support a modulation scheme such as 16 QAM or 64 QAM because a poor communication environment is assumed for the MTC UE. Thus, it is preferred to design a new CQI table, if repeated transmission of a PDSCH signal to the MTC UE is allowed.

For example, the new CQI table may be configured to support only QPSK. The CQI table may include information indicating transmission characteristics (e.g., a coding rate, cording efficiency, a repetition number, and/or a power offset) of the PDSCH signal. For example, the CQI table may further include a CQI index indicating a coding rate smaller than 78/1024 and/or a coding efficiency smaller than a specific coding efficiency (e.g., 0.1523).

[Table 19] is an exemplary CQI table including PDSCH characteristic information for an MTC UE.

TABLE 19

| CQI index | modulation | coding rate x 1024 | efficiency |
|---|---|---|---|
| 0 | | out of range | |
| 1 | QPSK | 0.25 | 0.0005 |
| 2 | QPSK | 0.5 | 0.0010 |
| 3 | QPSK | 1 | 0.0020 |
| 4 | QPSK | 2 | 0.0039 |
| 5 | QPSK | 3 | 0.0059 |
| 6 | QPSK | 5 | 0.0098 |
| 7 | QPSK | 10 | 0.0196 |
| 8 | QPSK | 20 | 0.0391 |
| 9 | QPSK | 39 | 0.0762 |
| 10 | QPSK | 78 | 0.1523 |
| 11 | QPSK | 120 | 0.2344 |
| 12 | QPSK | 193 | 0.3770 |
| 13 | QPSK | 308 | 0.6016 |
| 14 | QPSK | 449 | 0.8770 |
| 15 | QPSK | 602 | 1.1758 |

[Table 19] is an exemplary CQI table with only QPSK as a modulation order. Obviously, QPSK is an example and a CQI table including a combination of BPSK and QPSK or only BPSK may be configured.

Unlike the CQI table given as [Table 19], a repetition degree of a PDSCH signal may be specified in a CQI table. For example, both the modulation scheme and repetition number of a PDSCH signal may be explicitly mapped to a CQI index.

TABLE 20

| CQI index | modulation | coding rate x 1024 | efficiency | # of repetitions |
|---|---|---|---|---|
| 0 | | out of range | | — |
| 1 | QPSK | 78 | 0.0005 | 440 |
| 2 | QPSK | 78 | 0.0010 | 220 |
| 3 | QPSK | 78 | 0.0020 | 110 |
| 4 | QPSK | 78 | 0.0039 | 56 |
| 5 | QPSK | 78 | 0.0059 | 28 |
| 6 | QPSK | 78 | 0.0098 | 16 |
| 7 | QPSK | 78 | 0.0196 | 8 |
| 8 | QPSK | 78 | 0.0391 | 4 |
| 9 | QPSK | 78 | 0.0762 | 2 |
| 10 | QPSK | 78 | 0.1523 | — |
| 11 | QPSK | 120 | 0.2344 | — |
| 12 | QPSK | 193 | 0.3770 | — |
| 13 | QPSK | 308 | 0.6016 | — |
| 14 | QPSK | 449 | 0.8770 | — |
| 15 | QPSK | 602 | 1.1758 | — |

Referring to [Table 20], information about a repetition number of a PDSCH signal as well as information about a modulation scheme, a coding rate, and a coding efficiency of the PDSCH signal is mapped to a CQI index. That is, upon receipt of a CQI index listed in [Table 20], the UE may determine a modulation scheme, a coding rate, a coding efficiency, and a repetition number of a PDSCH signal to be received. For example, CQI index 9 indicates two repeated transmissions of a PDSCH at a coding rate of CQI index 10.

Therefore, the UE may determine how many times the same PDSCH signal to be received will be transmitted repeatedly.

[Table 21] is an exemplary CQI table that maps a power offset for CSR or CSI-RS power to a CQI index.

TABLE 21

| CQI index | modulation | coding rate x 1024 | efficiency | Power offset (dB) |
|---|---|---|---|---|
| 0 | | out of range | | — |
| 1 | QPSK | 78 | 0.0005 | 30 |
| 2 | QPSK | 78 | 0.0010 | 25 |
| 3 | QPSK | 78 | 0.0020 | 20 |
| 4 | QPSK | 78 | 0.0039 | 15 |
| 5 | QPSK | 78 | 0.0059 | 10 |
| 6 | QPSK | 78 | 0.0098 | 8 |
| 7 | QPSK | 78 | 0.0196 | 5 |
| 8 | QPSK | 78 | 0.0391 | 3 |
| 9 | QPSK | 78 | 0.0762 | 1 |
| 10 | QPSK | 78 | 0.1523 | — |
| 11 | QPSK | 120 | 0.2344 | — |
| 12 | QPSK | 193 | 0.3770 | — |
| 13 | QPSK | 308 | 0.6016 | — |
| 14 | QPSK | 449 | 0.8770 | — |
| 15 | QPSK | 602 | 1.1758 | — |

Referring to [Table 21], information about a power offset for a PDSCH signal as well as information about a modulation scheme, a coding rate, and a coding efficiency of the PDSCH signal is mapped to a CQI index. A power offset is a value set by the higher layer, representing an offset value for the transmission power of an RS (e.g., CRS or CSI-RS). Upon receipt of a CQI index listed in [table 21], the UE may determine a modulation scheme, a coding rate, a coding efficiency, and a power offset of a PDSCH signal to be transmitted.

[Table 19], [Table 20], and [Table 21] are CQI tables made on the assumption of 4 bits. Obviously, a CQI table having fewer bits may be configured for an MTC UE according to a communication environment and a network setting.

Also, information about PDSCH repetition numbers or transmission offset information for an RS, which is mapped to CQI indexes in [Table 20] and [Table 21] may be transmitted separately to the UE by System Information (SI), RRC signaling, or MAC signaling.

4.5 Methods for Designing CQI Table

Now, a description will be given of CQI tables applicable to embodiments of the present disclosure.

4.5.1 Methods for Designing CQI Table Having the Same SINR Interval as Legacy CQI Table On the assumption of 20 kbps as a data rate of a PDSCH and an Enhanced Pedestrian A (EPA) channel, an SINR satisfying an FER of 10% is about 4 dB. Herein, it is assumed that a UE has two reception antennas. In this case, if a typical link budget is assumed, a Maximum Coupling Loss (MCL) is 145.4 dB. The MCL is a value indicating a requirement for improving per-channel performance. If a coverage enhancement target is 155.7 dB, a performance enhancement of about 11.3 dB is needed for two reception antennas. On the assumption of a single reception antenna, a performance enhancement of about 15.3 dB is needed. That is, a PDSCH operating SINR is decreased to −19.3 dB.

The following [Table 22] illustrates exemplary calculated MCLs in an FDD system. It is assumed that an eNB has two transmission antennas and two reception antennas.

TABLE 22

| Physical channel name | PUCCH (1a) | PRACH | PUSCH | PDSCH | PBCH | SCH | PDCCH (1A) |
|---|---|---|---|---|---|---|---|
| Data rate(kbps) | | | 20 | 20 | | | |
| Transmitter | | | | | | | |
| (0) Max Tx power (dBm) | 23 | 23 | 23 | 46 | 46 | 46 | 46 |
| (1) Actual Tx power (dBm) | 23.0 | 23.0 | 23.0 | 32.0 | 36.8 | 36.8 | 42.8 |
| Receiver | | | | | | | |
| (2) Thermal noise density (dBm/Hz) | −174 | −174 | −174 | −174 | −174 | −174 | −174 |
| (3) Receiver noise figure (dB) | 5 | 5 | 5 | 9 | 9 | 9 | 9 |
| (4) Interference margin (dB) | 0 | 0 | 0 | 0 | 0 | 0 | 0 |
| (5) Occupied channel bandwidth (Hz) | 180000 | 1080000 | 360000 | 360000 | 1080000 | 1080000 | 4320000 |
| (6) Effective noise power = (2) + (3) − (4) + 10 log((5)) (dBm) | −116.4 | −108.7 | −113.4 | −109.4 | −104.7 | −104.7 | −98.6 |
| (7) Required SINR (dB) | −7.8 | −10.0 | −4.3 | −4.0 | −7.5 | −7.8 | −4.7 |
| (8) Receiver sensitivity = (6) + (7) (dBm) | −124.24 | −118.7 | −117.7 | −113.4 | −112.2 | −112.5 | −103.34 |
| (9) MCL = (1) − (8) (dB) | 147.2 | 141.7 | 140.7 | 145.4 | 149.0 | 149.3 | 146.1 |

Figure 16:
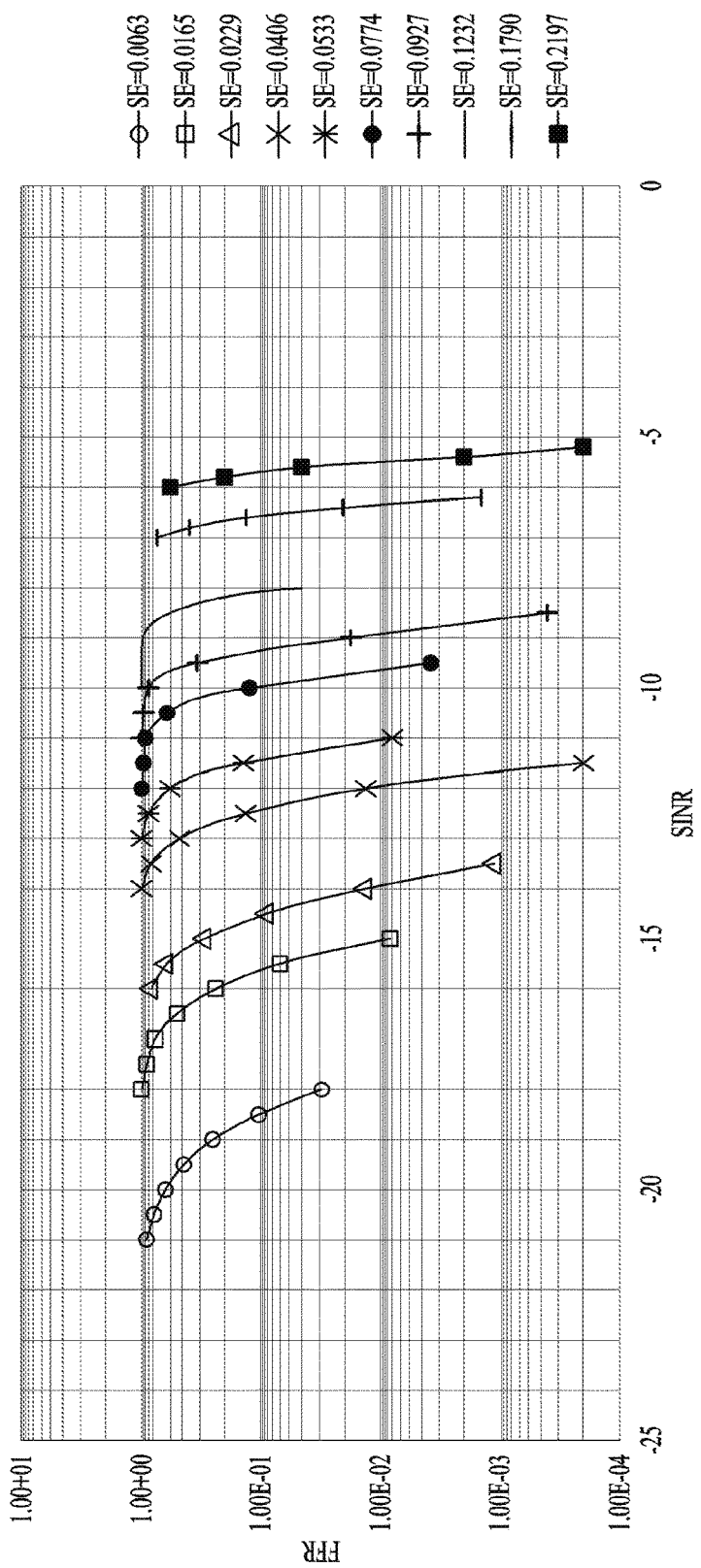
FIG. 16 is a view illustrating link performances with respect to various spectral efficiencies.

Herein, a new CQI index may be represented by calculating a corresponding spectral efficiency/coding rate, while the SINR interval of a CQI table for MTC UEs is maintained to be about 1.89 dB equal to that of a legacy CQI table. A spectral efficiency for a corresponding SINR may be obtained by deriving an approximate expression from a link simulation as illustrated in FIG. 16. FIG. 16 is a view illustrating link performances for various spectral efficiencies. An approximate expression for a spectral efficiency that minimizes the sum of the squares of the differences from actual values may be obtained from FIG. 16 by [Equation 7].

$$9.67 \times 10^{-5} \times SINR^3 + 0.00533232 \times SINR^2 + 9.89 \times 10^{-2} \times SINR + 0.629993 \quad \text{[Equation 7]}$$

A CQI table for MTC UEs may be generated from [Equation 7], which maintains the same SINR interval as a CQI table for legacy UEs in the LTE/LTE-A system. [Table 23] and [Table 24] are exemplary CQI tables designed to have the same SINR interval as the legacy CQI table.

TABLE 23

| CQI index | modulation | coding rate x 1024 | efficiency |
|---|---|---|---|
| 0 | | out of range | |
| 1 | QPSK | 3 | 0.0072 |
| 2 | QPSK | 5 | 0.0102 |
| 3 | QPSK | 6 | 0.0132 |
| 4 | QPSK | 10 | 0.0201 |
| 5 | QPSK | 17 | 0.0349 |
| 6 | QPSK | 31 | 0.0614 |
| 7 | QPSK | 53 | 0.1036 |
| 8 | QPSK | 78 | 0.1523 |
| 9 | QPSK | 120 | 0.2344 |
| 10 | QPSK | 193 | 0.3770 |
| 11 | QPSK | 308 | 0.6016 |
| 12 | QPSK | 449 | 0.8770 |
| 13 | QPSK | 602 | 1.1758 |
| 14 | 16 QAM | 378 | 1.4766 |
| 15 | 16 QAM | 490 | 1.9141 |

TABLE 24

| CQI index | modulation | coding rate x 1024 | efficiency |
|---|---|---|---|
| 0 | | out of range | |
| 1 | QPSK | 3 | 0.0072 |
| 2 | QPSK | 5 | 0.0102 |
| 3 | QPSK | 6 | 0.0132 |
| 4 | QPSK | 10 | 0.0201 |
| 5 | QPSK | 17 | 0.0349 |
| 6 | QPSK | 31 | 0.0614 |
| 7 | QPSK | 53 | 0.1036 |
| 8 | QPSK | 78 | 0.1523 |
| 9 | QPSK | 193 | 0.3770 |
| 10 | QPSK | 449 | 0.8770 |
| 11 | 16 QAM | 378 | 1.4766 |
| 12 | 16 QAM | 616 | 2.4063 |
| 13 | 64 QAM | 567 | 3.3223 |
| 14 | 64 QAM | 772 | 4.5234 |
| 15 | 64 QAM | 948 | 5.5547 |

4.5.2 CQI Table for MTC UEs Designed Based on Legacy CQI Table

To support new CQI indexes added to support MTC without an increase in the number of bits indicating a CQI index, a CQI table may be generated by replacing some CQI indexes in the legacy CQI table, in the following methods.

(1) Method 1

One of those methods is to replace as many CQI indexes as needed in a descending order of CQI indexes starting from the highest CQI index in [Table 19]. This method is characterized in that an SINR corresponding to a high CQI index is not highly likely to be generated for an MTC UE requiring coverage enhancement. Therefore, it may be expected that replacement of corresponding indexes with CQI indexes for MTC UEs will not have a great influence on performance. Or, it is also possible to support only QPSK as in [Table 19].

(2) Method 2

Another method is to replace CQI indexes requiring replacement, one every two CQI indexes, starting from the highest CQI index, and if CQI indexes are additionally to be replaced, to apply the afore-described Method 1. [Table 23] may be configured in this method. Method 2 may be designed such that all of operating SINR areas for legacy CQI indexes are covered due to a great change in a channel environment, with one CQI index replaced every two CQI indexes to decrease performance degradation.

(3) Method 3

The Table below illustrates a legacy CQI table.

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

At least one of CQI indexes corresponding to 16 QAM/64 QAM remains, with the other CQI indexes replaced with CQI indexes having a low modulation order for MTC UEs in the legacy CQI table.

(4) Method 4

First of all, 64 QAM indexes are replaced with CQI indexes for MTC UEs in the legacy CQI table. Subsequently, if CQI indexes for MTC UEs are to be additionally defined, they are configured by applying Method 2 to CQI indexes indicating 16 QAM, starting from the highest 16 QAM CQI index.

4.5.3 CQI Table Including Power Offset Information

[Table 20] illustrates a case in which power offset information is defined in a CQI table in order to indicate how many times a PDSCH is repeatedly transmitted to an MTC UE.

The power offset information is a value indicating a CE degree, which may be defined as a power offset required to achieve a lowest MCS level, QPSK and a spectral efficiency of 0.1523 in the legacy CQI table.

An MCS level which is neither out of range nor a low MCS level may also be available as a reference MCS level for power offsets. An exemplary CQI table designed in this manner is given in [Table 25].

TABLE 25

| CQI index | modulation | coding rate x 1024 | efficiency | Power offset (dB) |
|---|---|---|---|---|
| 0 | | out of range | | |
| 1 | QPSK | 3 | 0.0072 | 1.892x7 |
| 2 | QPSK | 5 | 0.0102 | 1.892x6 |
| 3 | QPSK | 6 | 0.0132 | 1.892x5 |
| 4 | QPSK | 10 | 0.0201 | 1.892x4 |
| 5 | QPSK | 17 | 0.0349 | 1.892x3 |
| 6 | QPSK | 31 | 0.0614 | 1.892x2 |
| 7 | QPSK | 53 | 0.1036 | 1.892 |
| 8 | QPSK | 78 | 0.1523 | |
| 9 | QPSK | 120 | 0.2344 | |
| 10 | QPSK | 193 | 0.3770 | |
| 11 | QPSK | 308 | 0.6016 | |
| 12 | QPSK | 449 | 0.8770 | |
| 13 | QPSK | 602 | 1.1758 | |

TABLE 25-continued

| CQI index | modulation | coding rate x 1024 | efficiency | Power offset (dB) |
|---|---|---|---|---|
| 14 | 16 QAM | 378 | 1.4766 | |
| 15 | 16 QAM | 490 | 1.9141 | |

While power offsets are defined as multiples of 1.892 dB in [Table 25], the eNB may set the power offsets to other values. Herein, spectral efficiency values are also changed according to the power offsets.

4.6 Methods for Designing Mother CQI Table

In another embodiment of the present disclosure, a mother CQI table may be configured. For example, a mother CQI table may be configured to include the legacy CQI table of the LTE/LTE-A system and CQI indexes required to support MTC UEs.

For example, the mother CQI table may have 32 CQI indexes which cover −19 dB as a lowest SINR and support 256 QAM as a highest modulation scheme. In the legacy CQI table, the lowest SINR is −7 dB (CQI index=1) and CQI indexes are configured at an interval of 2 dB. The mother CQI table may support −19 dB as the lowest SINR for MTC UEs.

The eNB may indicate per-UE or per-cell CQI indexes by a physical-layer signal (PDCCH) or a higher-layer signal (RRC signal). The mother CQI table is preferably designed to cover even an SINR area corresponding to a maximum CE supported in a wireless access system or a cell. The eNB may select CQI indexes according to a CE level of each UE or a maximum CE level supported by the cell, and indicate the selected CQI indexes to specific UEs.

Hereinbelow, various methods for designing a mother CQI table will be described. It may be assumed that a CQI index indicating 'out of range' is fixed to CQI index 0 in mother CQI tables designed in these methods. Mapping to CQI index 1 to CQI index 15 which correspond to the size of the legacy CQI table may be selected or set as follows.

(1) Method 1

CQI index 0 to CQI index 15 are determined according to a maximum CE level of the network. For example, a sub CQI table may be configured for use in the cell by mapping CQI index 1 to the maximum CE level (e.g., SINR=−19 dB) of the network and selecting 15 CQI indexes starting from the corresponding CQI index from the mother CQI table.

For example, if a value corresponding to CQI index 5 in [Table 20] is a maximum value supported by the network, CQI index 5 to CQI index 19 of the mother CQI table may be mapped to CQI index 1 to CQI index 15 in the sub CQI table.

(2) Method 2

The eNB may select specific CQI indexes from the mother CQI table according to a required CE level and indicate the selected CQI indexes to each specific UE or cell.

Or, the eNB may configure a sub CQI table according to a CE level configured for each UE. For example, the eNB may configure a sub CQI table by mapping a CE level required for each UE to CQI index 1 (CQI=1) in the sub CQI table and then selecting 14 CQI indexes sequentially from the mother CQI table.

(3) Method 3

The eNB may fixedly configure a predetermined number of sub CQI tables from the mother CQI table. Herein, the eNB may transmit information about a sub CQI table to be used for each UE or cell to UEs.

For example, the legacy CQI table used in the LTE/LTE-A system may be configured as a first sub CQI table (or CQI table 1), the CQI table described in [Table 20] may be configured as a second sub CQI table (or CQI table 2), and the CQI table described in [Table 24] may be configured as a third sub CQI table (or CQI table 3). For each UE, the eNB may configure CQI table information or a CQI table index indicating such a configured sub CQI table.

(4) Method 4

The eNB may configure CQI indexes for each UE based on the configured mother CQI table. That is, the eNB may transmit a CQI index to a UE depending on whether the UE is an MTC UE or according to a system environment.

(5) Method 5

A sub CQI table may be selected and used according to whether an MTC UE operates in the CE mode. For example, the MTC UE may select and use one of the legacy CQI table and a new CQI table defined for MTC UEs according to whether the MTC UE operates in the CE mode.

Or, the MTC UE may select and use a specific sub CQI table from among sub CQI tables pre-configured from the mother CQI table according to whether the MTC UE operates in the CE mode. For example, if the eNB transmits CQI index 5 to the MTC UE by a physical-layer signal, the MTC UE determines whether it is currently in the CE mode. If the MTC UE is in the CE mode, the MTC UE may receive a PDSCH based on a modulation scheme and coding rate indicated by CQI index 5 in the second or third sub CQI table configured in Method 3.

Or, the MTC UE may determine whether the MTC UE is in the CE mode or a normal mode according to a sub CQI table configured for the MTC UE. For example, if the MTC UE receives an indication indicating use of a sub CQI table supporting the CE mode (e.g., sub CQI table 2 or 3 in Method 3), the MTC UE may operate in the CE mode, determining that it is to operate in the CE mode. Herein, if the CE mode is configured for the MTC UE even in a good coverage environment, the MTC UE may determine a CQI, TM, and MCS table suitable for the CE mode.

Further, if a plurality of MCS tables are available to the MTC UE, the eNB may indicate to the MCS UE which sub CQI table and which MCS table are to be used. Herein, the MTC UE may consider that an SINR range covered by the MTC UE has been determined from the CQI table configured by the eNB.

(6) Method 6

The network may configure a CQI table to be used for each cell by an MIB or an SIB. This may be related to whether the MTC UE operates in the CE mode. This may imply that if the MTC UE supports the CE mode, a CQI table (or a sub CQI table) corresponding to the CE mode is configured for the MTC UE.

Or, this may imply that if a CQI table used for the CE mode is configured for the MTC UE, the network supports CE. One of methods for indicating a maximum CE level is to indicate a CQI index to which CQI index 1 configured for the MTC UE is mapped, in the mother CQI table, to thereby indicate a maximum CE level. For example, it is assumed that CQI index 1 of the mother CQI table supports −19 dB. This may imply that if CQI index 1 is mapped to CQI index 1 of the mother CQI table, the maximum CE level of the network supports up to −19 dB.

In the above-described Method 1 to Method 6, a mother CQI table and a sub CQI table may be configured. The mother CQI table may include 32 or more CQI indexes. Herein, to represent the CQI indexes, 5 bits may be used. If the mother CQI table is used, the eNB may transmit CQI indexes for a legacy UE and an MTC UE by use of the single CQI table. However, if the network considers backward compatibility with the legacy system, 4-bit CQI indexes may be used. In this case, the mother CQI table may be divided into 4-bit sub CQI tables (refer to Methods 1, 2, 3, and 5).

4.7 CSI Feedback Method

Figure 17:
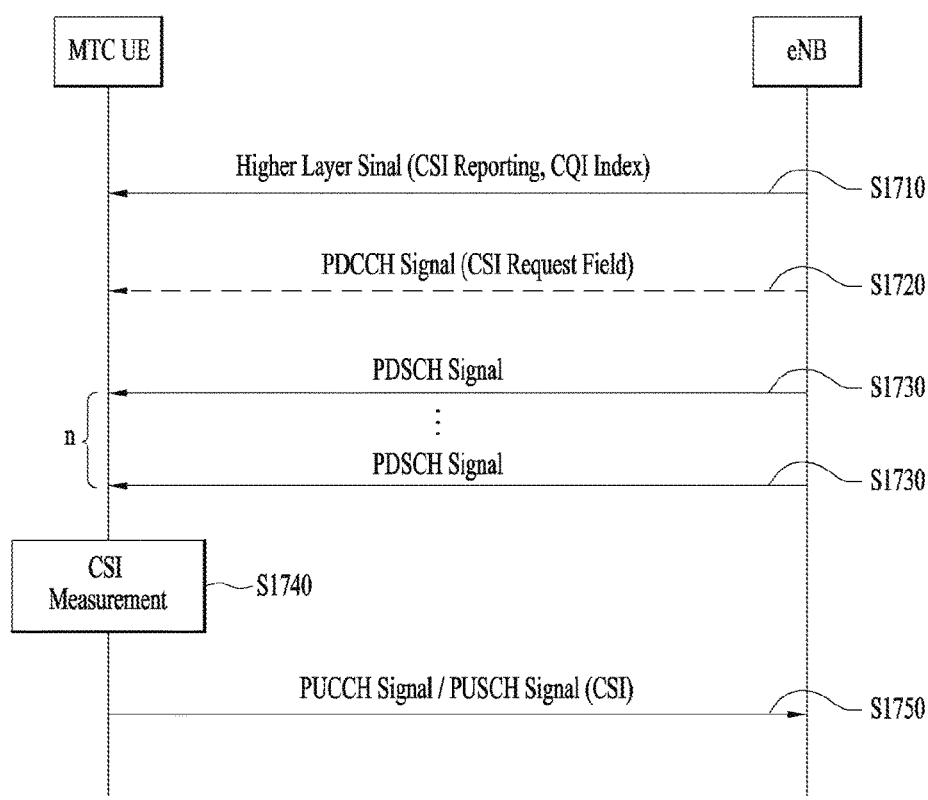
FIG. 17 is a view illustrating one of methods for feeding back Channel State Information (CSI) by a Machine Type Communication (MTC) User Equipment (UE)

FIG. 17 illustrates one of CSI feedback methods of an MTC UE.

FIG. 17 may be used for periodic or aperiodic CSI reporting. Further, the method described in FIG. 17 may be applied alone or in combination of section 1 to section 4.6. Further, for what is not described in the description of FIG. 17, refer to the descriptions of section 1 to section 4.6.

The eNB and/or the MTC UE may maintain and manage a mother CQI table. The mother CQI table may be preset in the system or the eNB may transmit corresponding information to UEs.

Referring to FIG. 17, the eNB transmits a higher layer signal (e.g., an RRC signal or a MAC signal) including a CSI reporting mode and/or a CQI index to the MTC UE. The CSI reporting mode may be indicated by the same higher layer signal along with the CQI index or a separate higher layer signal (S1710).

With the mother CQI table used, sub CQI tables for the MTC UE may be used. For the sub CQI tables, refer to section 4.6. If the sub CQI tables are used for a specific MTC UE or a cell, the eNB may transmit information indicating the sub CQI table to the MTC UE in step S1710 or in an MIB or SIB.

If the eNB is to request aperiodic CSI reporting, the eNB may transmit a PDCCH signal including an aperiodic CSI request field to the MTC UE. The PDCCH signal may be repeatedly transmitted (x times) as described in Section 4.4.1 (S1720).

The eNB may repeatedly transmit a PDSCH signal to the UE. That is, the eNB transmits the same n PDSCH signals in n subframes to the UE. The UE may determine a modulation scheme, a coding rate, and a coding efficiency of the PDSCH signal by the CQI index received in step S1710. If information about a repetition number is configured as illustrated in [Table 20], the repetition number may also be acquired by the CQI index. If information about a repetition number is not mapped to a CQI index, the information about the repetition number may be transmitted to the UE by a higher layer signal (S1730).

If the PDSCH signal is repeatedly transmitted, the UE may decode the PDSCH signal by accumulating the PDSCH signals repeatedly transmitted in the n subframes. Or the MTC UE may decode an individual PDSCH signal transmitted in each subframe. Further, the UE measures CSI in CSI measurement resources (i.e., CSI reference resources) defined in section 4.3. The UE may measure CSI in a valid DL subframe on the basis of a subframe in which the UE receives a last of then PDSCH signals (S1740).

CSI content measured in step S1740 by the UE is determined according to a CSI reporting mode. Therefore, the UE may measure CSI based on the CSI reporting mode indicated in step S1710 (refer to section 3.3.1).

The UE may transmit a PUSCH signal including the measured CSI to the eNB in an allocated PUSCH resource region. Herein, the PUSCH signal may be repeatedly transmitted to the eNB m times. The repetition number is preset or indicated by a higher layer signal by the eNB (S1750).

The number of repeatedly transmitted PDCCH signals, x, and the number of repeatedly transmitted PUSCCH signals, m may be set to be equal to the repetition number of a PDSCH signal mapped to the CQI index, n.

FIG. 17 may be used in a periodic CSI feedback method. In this case, step S1740 may not be performed. The UE may decode a PDSCH that has been repeatedly transmitted n times, measures CSI for the PDSCH, and transmit the CSI in a periodically allocated PUCCH resource region to the eNB. CSI content measured by the UE is determined according to a CSI reporting mode.

Also, regarding the periodic CSI reporting, the eNB may transmit information about an individual transmission period of CSI content (i.e., CQI, PMI, and RI) to the UE by a higher layer signal. Therefore, the UE may transmit the measured CSI content to the eNB by a PUCCH signal according to each transmission period. Herein, the PUCCH signal may be transmitted repeatedly and the repetition number may be preset or indicated by a higher-layer signal by the eNB.

5. Apparatuses

Apparatuses illustrated in FIG. 18 are means that can implement the methods described before with reference to FIGS. 1 to 17.

A UE may act as a transmission end on a UL and as a reception end on a DL. An eNB may act as a reception end on a UL and as a transmission end on a DL.

That is, each of the UE and the eNB may include a Transmitter (Tx) 1840 or 1850 and a Receiver (Rx) 1860 or 1870, for controlling transmission and reception of information, data, and/or messages, and an antenna 1800 or 1810 for transmitting and receiving information, data, and/or messages.

Each of the UE and the eNB may further include a processor 1820 or 1830 for implementing the afore-described embodiments of the present disclosure and a memory 1880 or 1890 for temporarily or permanently storing operations of the processor 1820 or 1830.

The embodiments of the present disclosure may be implemented using the components and functions of the above-described UE and eNB. For example, the processor of the eNB may indicate a CQI reporting mode, a CQI index, and/or a CSI reporting period to the UE by one or more higher-layer signals, configure a plurality of PDCCH signals and/or a plurality of PDSCH signals, and transmit the PDCCH signals and/or the PDSCH signals to the MTC UE in a combination of the methods disclosed in the afore-described section 1 to section 4. Further, the processor of the UE may receive n times repeated PDCCH signals and/or PDSCH signals, decode the PDCCH signals and/or the PDSCH signals, measure CSI for a valid subframe, and report the CSI. Further, the processor of the eNB may manage a mother CQI table and transmit information about the mother CQI table and/or information about a sub CQI table to the MTC UE. For details, refer to section 4.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 18 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1880 or 1830 and executed by the processor 1820 or 1890. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method for feeding back Channel State Information (CSI) by a Machine Type Communication (MTC) User Equipment (UE) in a wireless access system supporting MTC, the method comprising:
   receiving a higher-layer signal including a Channel Quality Indicator (CQI) index selected from a mother CQI table,
   wherein the mother CQI table includes first CQI indexes included in a first CQI table for non-MTC UE, and second CQI indexes not included in the first CQI table,
   wherein the first CQI indexes include a CQI index having a lowest spectral efficiency among CQI indexes of the first CQI table, and at least one of the first CQI indexes related to 16QAM or 64QAM is included in the mother CQI table, and
   wherein the second CQI indexes have lower spectral efficiency comparing to the CQI index having the lowest spectral efficiency among CQI indexes of the first CQI table;
   receiving a Physical Downlink Shared Channel (PDSCH) transmitted repeatedly based on a modulation scheme and a coding rate indicated by the selected CQI index from the mother CQI table;
   measuring CSI for the PDSCH; and
   feeding back the measured CSI.

2. The method according to claim 1, wherein the mother CQI table is divided into two or more sub CQI tables, and the higher-layer signal further includes CQI table index information indicating one of the two or more sub CQI tables to be used.

3. The method according to claim 1, wherein the first and the second CQI indexes included in the mother CQI table indicate modulation schemes and coding rates configured to indicate the same SINR interval.

4. The method according to claim 1,
   wherein the mother CQI table includes 15 CQI indexes, and
   wherein CQI index 1 to CQI index 15 of the mother CQI table are determined based on a maximum Coverage Enhancement (CE) level supported by a network.

5. The method according to claim 1, wherein the measured CSI is transmitted repeatedly a predetermined number of times.

6. A Machine Type Communication (MTC) User Equipment (UE) for feeding back Channel State Information (CSI) in a wireless access system supporting MTC, the MTC UE comprising:
   a transmitter;
   a receiver; and
   a processor having information about one or more Channel Quality Indicator (CQI) tables for measuring CSI,
   wherein the processor is operatively connected to the receiver and the transmitter, and is configured to:
      receive a higher-layer signal including a Channel Quality Indicator (CQI) index selected from a mother CQI table,
      wherein the mother CQI table includes first CQI indexes included in a first CQI table for non-MTC UE, and second CQI indexes not included in the first CQI table,
      wherein the first CQI indexes include a CQI index having a lowest spectral efficiency among CQI indexes of the first CQI table, and at least one of the first CQI indexes related to 16QAM or 64QAM is included in the mother CQI table and
      wherein the second CQI indexes have lower spectral efficiency comparing to the CQI index having a lowest spectral efficiency among CQI indexes of the first CQI table;
      receive a Physical Downlink Shared Channel (PDSCH) transmitted repeatedly based on a modulation scheme and a coding rate indicated by the selected CQI index from the mother CQI table,
      measure CSI for the PDSCH, and
      feed back the measured CSI.

7. The MTC UE according to claim 6, wherein the mother CQI table is divided into two or more sub CQI tables, and the higher-layer signal further includes CQI table index information indicating one of the two or more sub CQI tables to be used.

8. The MTC UE according to claim 6, wherein the first and the second CQI indexes included in the mother CQI table indicate modulation schemes and coding rates configured to indicate the same SINR interval.

9. The MTC UE according to claim 6,
wherein the mother CQI table is configured to include up to a Signal to Interference plus Noise Ratio (SINR) area for a maximum Coverage Enhancement (CE) level supported by a network,
wherein the CQI index is selected in consideration of a CE level supported by the MTC UE, and
wherein CQI index 1 to CQI index 15 of the mother CQI table are determined by the maximum CE level.

10. The MTC UE according to claim 6, wherein the measured CSI is transmitted repeatedly a predetermined number of times.

* * * * *